US012495315B2

(12) United States Patent
Smith et al.

(10) Patent No.: US 12,495,315 B2
(45) Date of Patent: Dec. 9, 2025

(54) QUARANTINE CONTROL NETWORK IN A 5G RAN FOR COORDINATED MULTI-LAYER RESILIENCY OF NETWORK SLICE RESOURCES

(71) Applicant: Intel Corporation, Santa Clara, CA (US)

(72) Inventors: Ned M. Smith, Beaverton, OR (US); Satish Chandra Jha, Portland, OR (US); Vesh Raj Sharma Banjade, Portland, OR (US); S M Iftekharul Alam, Hillsboro, OR (US); Christian Maciocco, Portland, OR (US); Marcio Rogerio Juliato, Portland, OR (US); Manoj R. Sastry, Portland, OR (US); Kshitij Arun Doshi, Tempe, AZ (US); Srikathyayani Srikanteswara, Portland, OR (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 17/484,242

(22) Filed: Sep. 24, 2021

(65) Prior Publication Data

US 2022/0014948 A1 Jan. 13, 2022

(51) Int. Cl.
*H04W 24/04* (2009.01)
*H04W 72/543* (2023.01)
(Continued)

(52) U.S. Cl.
CPC ......... *H04W 24/04* (2013.01); *H04W 72/543* (2023.01); *H04W 72/56* (2023.01);
(Continued)

(58) Field of Classification Search
CPC ..... H04W 24/00; H04W 24/04; H04W 72/00; H04W 72/10; H04W 72/087; H04W 8/30;
(Continued)

(56) References Cited

U.S. PATENT DOCUMENTS 6,442,694 B1 * 8/2002 Bergman ............ H04J 14/0245
709/224
2006/0223493 A1 * 10/2006 Freund .................. H04W 24/04
455/404.1
(Continued)

FOREIGN PATENT DOCUMENTS

CN 108053126 * 12/2017 ............. G06Q 10/06
CN 113965448 * 9/2021 ......... H04L 41/0631
(Continued)

OTHER PUBLICATIONS

"European Application Serial No. 22189805.9, Response filed Sep. 26, 2023 to Office Action mailed Apr. 3, 2023", 25 pgs.
(Continued)

*Primary Examiner* — Warner Wong
(74) *Attorney, Agent, or Firm* — Schwegman Lundberg & Woessner, P.A.

(57) ABSTRACT

A system is disclosed for quarantining and recovery of a network after an outage or in advance of a potential outage. Unaffected network slices are isolated and recovery is initiated by quarantine physical and virtual network functions. An AI model is trained based on recent events detected by sensors disposed throughout the network to determine whether to quarantine network slices, move services to unaffected network slices, or initiate recovery. Once the network is stabilized, resources that are specifically allocated for recovery and services are released and the traffic moved back to the recovered network slices.

25 Claims, 16 Drawing Sheets

(51) Int. Cl.
*H04W 72/56* (2023.01)
*H04L 9/00* (2022.01)
*H04L 9/40* (2022.01)
*H04W 8/30* (2009.01)

(52) U.S. Cl.
CPC .......... *H04L 9/004* (2013.01); *H04L 63/1441* (2013.01); *H04L 63/1458* (2013.01); *H04W 8/30* (2013.01)

(58) Field of Classification Search
CPC . H04L 63/1441; H04L 63/1458; H04L 9/004; H04L 41/06; H04L 41/0654; H04L 41/0659; H04L 41/0661; H04L 45/28; H04L 49/557; H04L 69/40
See application file for complete search history.

(56) References Cited

U.S. PATENT DOCUMENTS

| | | | | |
|---|---|---|---|---|
| 2006/0236391 | A1* | 10/2006 | Kim | H04L 63/1466 726/22 |
| 2007/0101422 | A1* | 5/2007 | Carpenter | H04L 63/14 709/224 |
| 2009/0044265 | A1* | 2/2009 | Ghosh | G06F 21/552 709/224 |
| 2010/0146615 | A1* | 6/2010 | Locasto | H04L 63/1416 726/11 |
| 2011/0289586 | A1* | 11/2011 | Kc | G06F 21/566 726/24 |
| 2017/0237767 | A1* | 8/2017 | George | H04L 63/1416 726/23 |
| 2017/0310703 | A1* | 10/2017 | Ackerman | H04L 63/1416 |
| 2017/0353490 | A1* | 12/2017 | Krauss | H04L 63/1491 |
| 2018/0109496 | A1 | 4/2018 | Thubert et al. | |
| 2019/0068618 | A1* | 2/2019 | Mestha | H04L 63/1466 |
| 2019/0173901 | A1* | 6/2019 | Mi | H04L 41/142 |
| 2019/0379683 | A1 | 12/2019 | Overby et al. | |
| 2020/0244691 | A1* | 7/2020 | Veeramany | H04L 63/0236 |
| 2022/0014947 | A1* | 1/2022 | Smith | H04W 24/04 |
| 2022/0114423 | A1* | 4/2022 | Kaya | H04B 7/0617 |
| 2022/0156410 | A1* | 5/2022 | Ocheretny | G06F 21/74 |
| 2022/0191217 | A1* | 6/2022 | Rose | H04L 63/1425 |
| 2022/0225227 | A1* | 7/2022 | Jha | H04W 24/04 |
| 2022/0369112 | A1* | 11/2022 | Sharma | H04W 12/12 |
| 2023/0044156 | A1* | 2/2023 | Mehta | H04L 63/20 |
| 2024/0031235 | A1* | 1/2024 | Zhu | H04L 41/0866 |

FOREIGN PATENT DOCUMENTS

| | | | | |
|---|---|---|---|---|
| CN | 117955703 | * | 1/2024 | ............ H04L 9/40 |
| EP | 3340676 | | 6/2018 | |
| JP | 2006352719 | * | 12/2006 | ............ H04L 12/40 |
| JP | 2008154012 | * | 7/2008 | ............ H04L 12/28 |
| WO | WO-2024149442 A1 | * | 7/2024 | ............ G06F 21/552 |

OTHER PUBLICATIONS

"European Application Serial No. 22189805.9, Extended European Search Report mailed Feb. 15, 2023", 10 pgs.

"Network Functions Virtualisation NFV Release 3 Reliability Report on NFV Resiliancy for the Support of Network Sllicing", [Online] Retrieved from the Internet: https: www.etsi.org deliver etsi_gr NFV-REL 001_099 010 03.01.01_60gr_NFV-REL010v030101p. pdf, (Jun. 2019), 39 pgs.

* cited by examiner

QUARANTINE CONTROL NETWORK IN A 5G RAN FOR COORDINATED MULTI-LAYER RESILIENCY OF NETWORK SLICE RESOURCES

TECHNICAL FIELD

Embodiments described herein generally relate to data processing, network communication, and communication system implementations, and in particular, to techniques for mitigating network outages.

BACKGROUND

The use and complexity of wireless systems, which include $4^{th}$ generation (4G) and $5^{th}$ generation (5G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, gateways, and other equipment to support communication by the UEs, has become increasingly complicated. As expected, a number of challenges abound with the increasing complexity in next generation (NG) (or new radio (NR)) systems.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

One in new systems challenge involves the network responding to mitigate outages or potential outages while simultaneously providing a minimal quality of service (QoS) to UEs being served by the network. Such outages may be wholly innocent, such as being caused by equipment failure, severe weather, or the like, or may be malicious in nature, such as use of a denial of service (DOS) attack on, or implantation of a virus into, one or more of the pieces of network equipment, for example. The manner of mitigation, that is the corrective actions to take, is moreover exceedingly difficult to assess in real time given imperfect Fault-Attack-Failure-Outage (FAFO) intelligence as the root-cause analysis may take time and involve continued data. Nevertheless, network resiliency control is desirable to minimize the negative effects of FAFO events. Providing network resiliency is further complicated as Mobile Network Operators (MNO) strictly limit applications running on the network.

In the following description, methods, configurations, and related apparatuses are disclosed for providing containment control of FAFO events in a network using a QCN. Sentinels control functionality of the QCN based on FAFO intelligence from FAFO sensors. AI modeling is used to determine containment and restoration of the network suffering the FAFO event, as well as providing resources or adjustments in available (non-contained resources) for existing UEs and services.

Figure 1A:
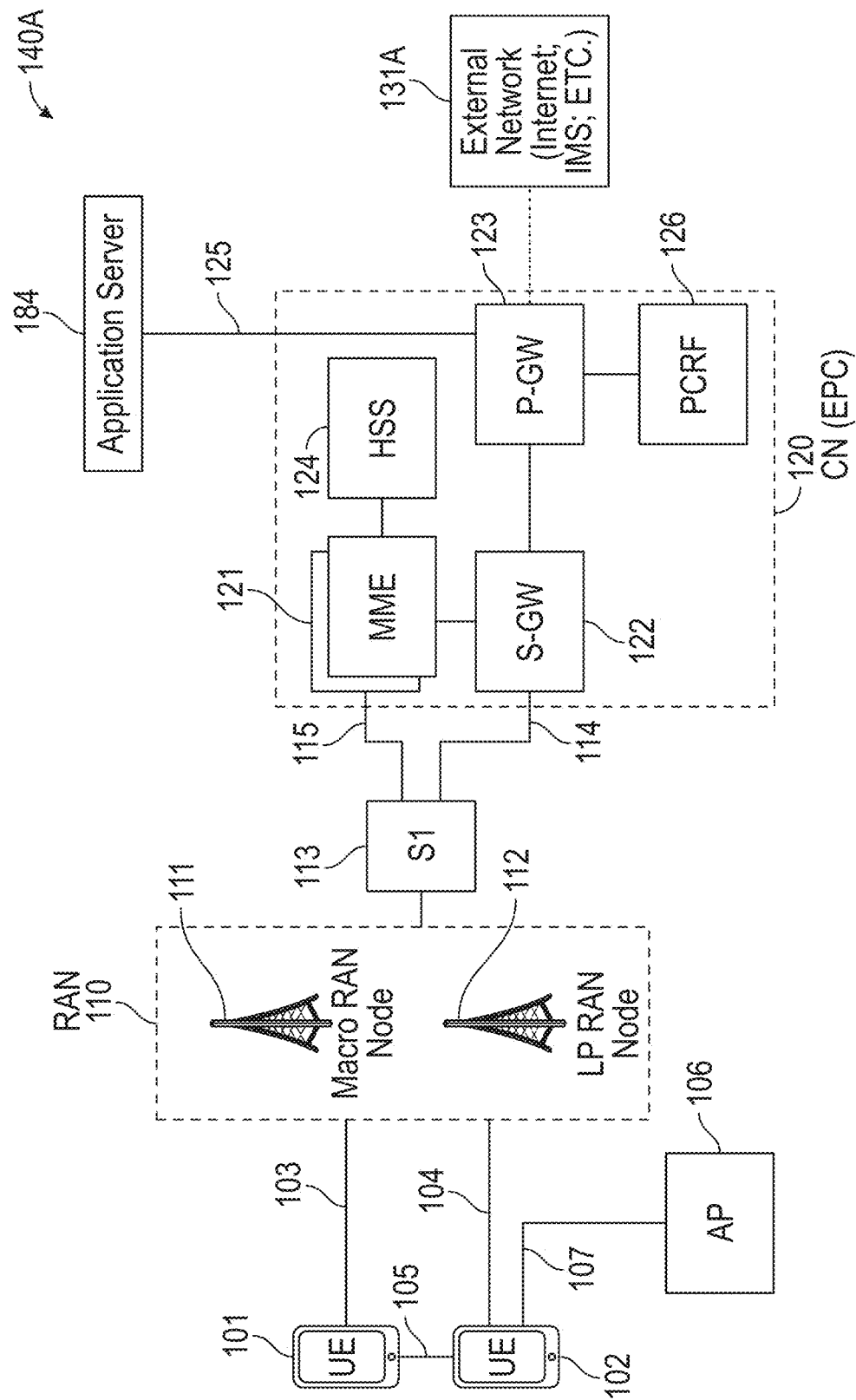
FIG. 1A illustrates an architecture of a network, according to an example.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6

GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts, the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions. PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
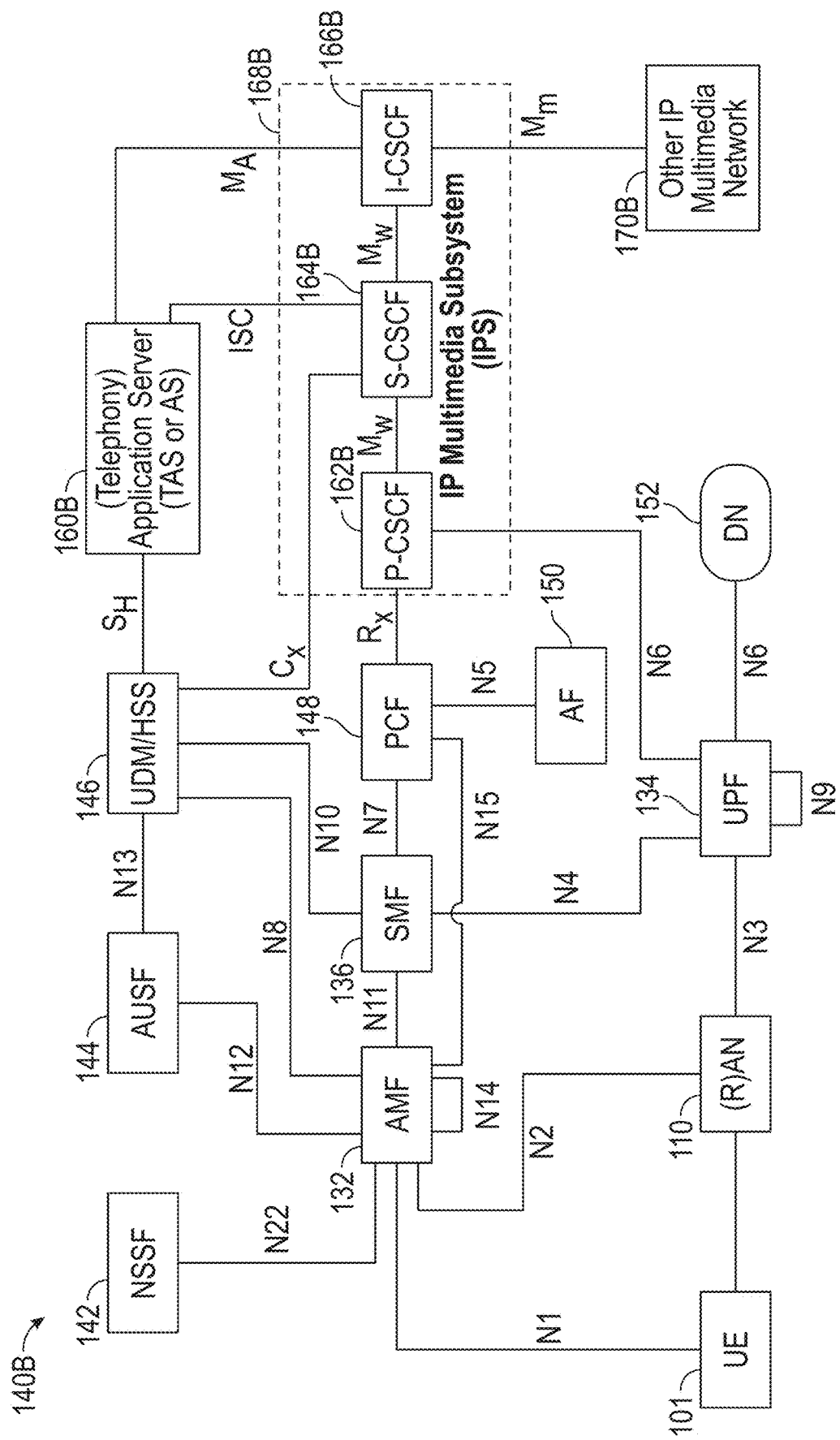
FIG. 1B illustrates a non-roaming 5G system architecture, according to an example.

FIG. 1B illustrates a non-roaming 5G system architecture in accordance with some aspects. In particular. FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g., an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134). N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
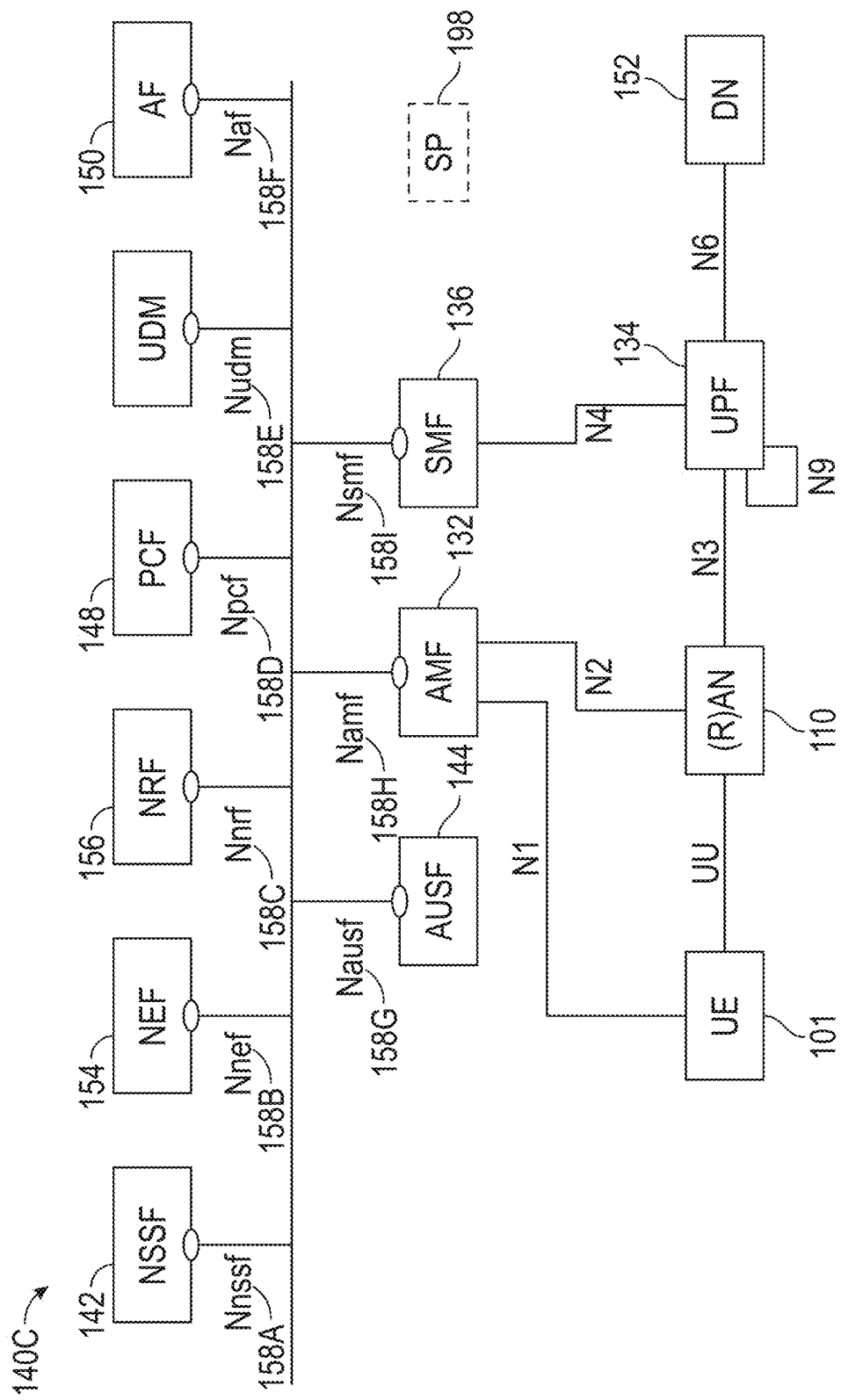
FIG. 1C illustrates a non-roaming 5G system architecture, according to an example.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156). Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
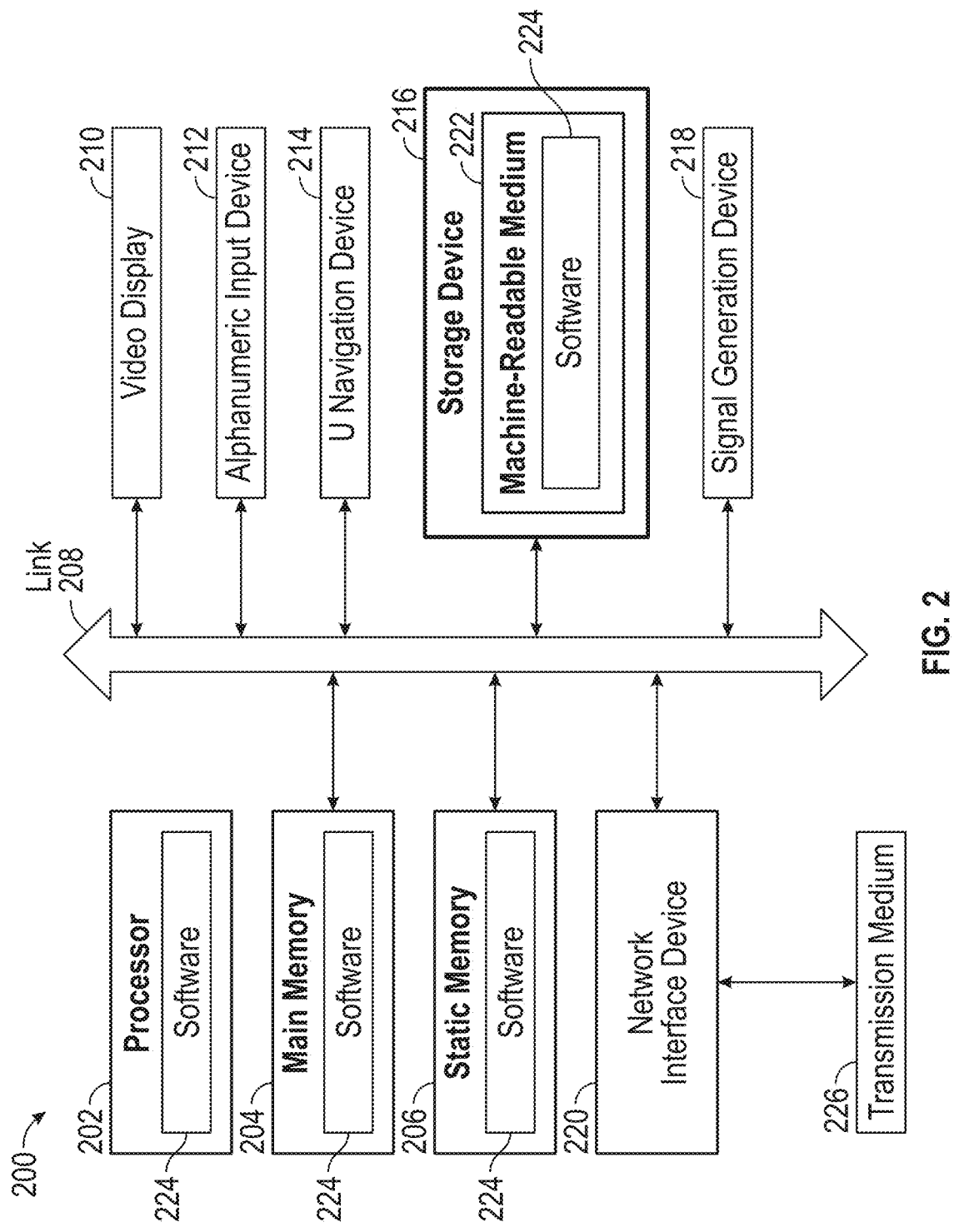
FIG. 2 illustrates a block diagram of a communication device, according to an example.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory, or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)). Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex. DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard). Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V21) and Infrastructure-to-Vehicle (12V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum. (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as APs, eNBs, NR or gNBs—note that this term is typically used in the context of 3GPP fifth generation (5G) communication systems, etc. Still, a UE may take this role as well and act as an AP, eNB, or gNB; that is some or all features defined for network equipment may be implemented by a UE.

Network slicing has been supported since 3GPP release 15. Network slicing enables the MNO to create multiple virtualized networks over a common multi-domain infrastructure using NFVs. Each network slice may support a specific application, service, set of users, or network. Network slices may support, for example, enhanced Mobile Broadband (eMBB), Machine-Type Communications (MTC), and Ultra-reliable Low-Latency Communications (uRLLC), eMBB network slices may provide high reliability, high bandwidth service with low latency for the video-based applications that use such slices; MTC (or IoT) network slices provide low bandwidth, non latency/reliability-dependent service for a large number of low-traffic devices; uRLLC network slices provide high reliability, moderate bandwidth service with very low latency for applications such as vehicle-to-anything (V2X), public safety, medical, and industrial automation-related applications and use MEC. Thus, the network slices may be optimized for different performances.

As above, to provide network resiliency control when network slicing is used, it would be desirable to provide quarantine resources that are inaccessible except when a FAFO event occurs. However, even quarantine physical network functions (QPNFs) may be executed in a node that itself is compromised by the FAFO event.

Figure 3:
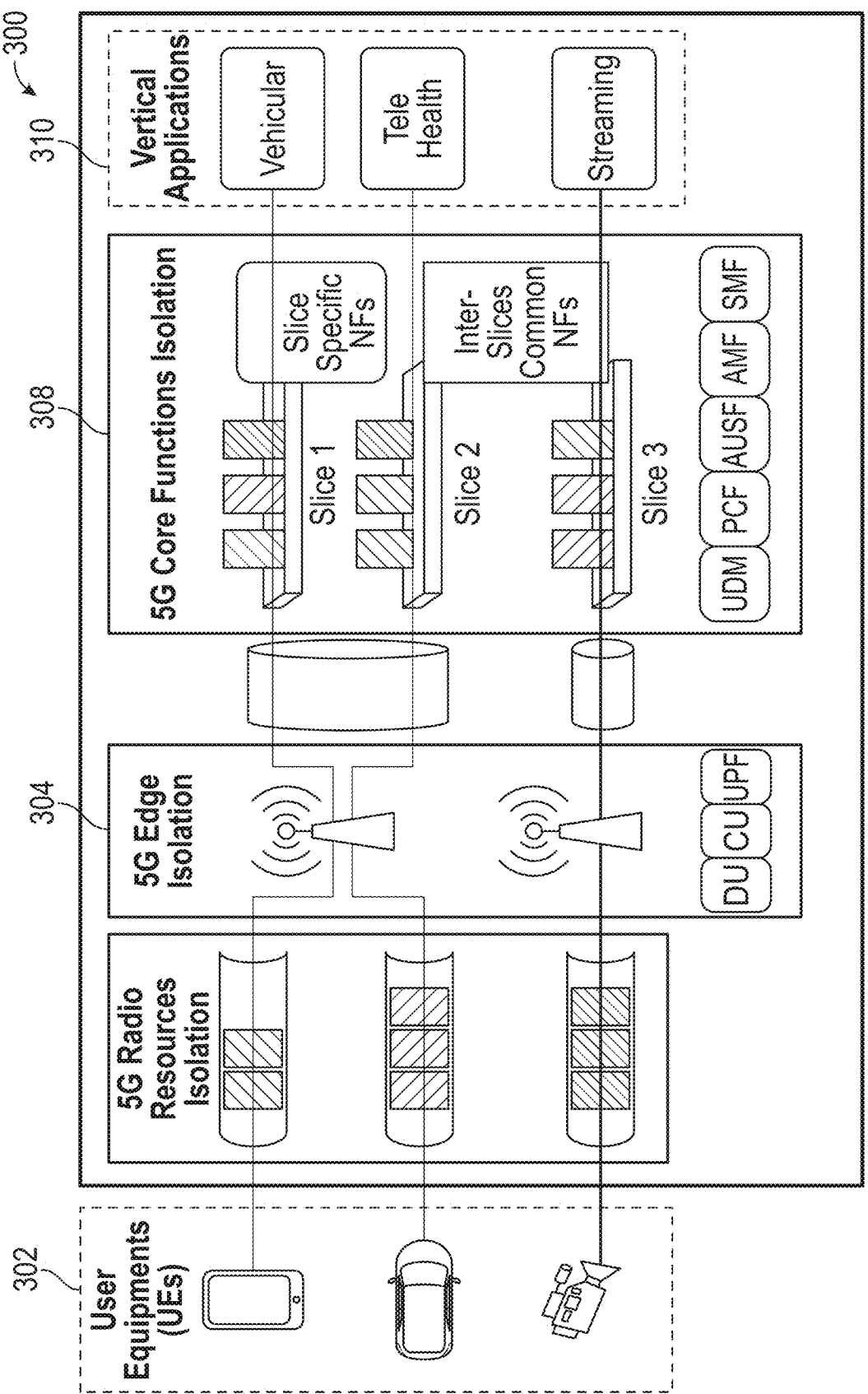
FIG. 3 illustrates a simplified International Mobile Telecommunications (IMT) network, according to an example.

FIG. 3 illustrates a simplified IMT network in accordance with some embodiments. A number of networks elements are not shown for convenience. One or more UEs 302 are coupled to the IMT network 300. The UEs 302 may include mobile devices, vehicular devices, and other devices (e.g., streaming devices). As shown, the communications from each UE 302 are isolated from each other by the use of different network slices. The resources to provide communications for each of the UEs 302 that are assigned to a network slice may be dedicated to that network slice, although some of the network functions may be isolated and others of the network functions may be shared among slices.

The IMT network 300 includes a RAN 304, core functions 308, and vertical applications offered by different servers 310. The RAN 304 may include RAN isolation edge devices and may be 5G or 6G devices. The RAN 304 may have an open RAN (O-RAN) architecture that includes a central unit (O-CU), one or more distributed units (O-DUs), and may include the UPF.

The O-DU operates lower layer protocols of the RAN stack, including the Media Access Control (MAC) layer that schedules Physical Resource Blocks (PRBs) for the UEs 302. The O-DU receives the slice configuration parameters from the O1 interface to a non real-time (RT) RAN intelligent controller (RIC) of the service management and orchestration (SMO), and dynamic slice optimization guidance from the near real-time RIC through the E2 interface.

In order to apply RAN slicing in the O-RAN, both the O-CU and O-DU support network slicing, with dynamic slice optimization being provided through the E2 interface. The O-CU operates the upper layer protocols of the RAN stack, such as Radio Resource Management (RRM). The RRM is responsible for managing resources, and in case of slicing—the allocation of resources between slices, the O-CU execute slice-specific resource allocation strategies and drives the O-DU. The O-CU interacts with a near-RT RIC to provide slice specific performance measurements (PMs).

The non RT RIC and near-RT RIC are logical functions that respectively provides policies referenced by the near-RT RIC for enforcement and communicates between the application layer and the infrastructure layer that includes the O-CU and O-DU. The non RT RIC manages artificial intelligence/machine learning (AI/ML) models that the near-RT RIC then uses to make decisions based on the network's current context. The near-RT RIC controls and optimizes the lower levels of the RAN 304 to enforce policies that control routing and QoS, among other policies.

The non-RT RIC is aware of RAN slices in which fundamental slicing use cases (requests for creation, activation, modification, de-activation, and termination of the network slices) are supported and actively assisted through AI/ML models. To generate the AI/ML models to be deployed in the near-RT RIC, the non-RT RIC retrieves slice specific PMs and configuration parameters of the slices. Training models enable non-RT optimization of the slice-specific parameters over the O1 interface. The performance, configuration and other data are then used to assist the near-RT RIC to provide dynamic slice optimization.

The near-RT RIC enables near real-time (sub second) control of RAN elements and their resources through the E2 interface. Similar to the non-RT RIC, the near-RT RIC is aware of RAN slices in which fundamental slicing use cases are supported. Once these slices are in operation, slice-specific PMs from E2 nodes are gathered and sent to the near-RT RIC, which then uses the PMs and the slice configuration data to apply dynamic slice optimization to assure slice service level agreements (SLAs).

The core functions 308 include network functions that provide slice functionality. The network functions include the UDM, PCF, AMF, SMF, and AUSF described above in relation to FIGS. 1A-1C and may be physical network functions (PNFs) and/or virtual network functions (VNFs). As shown, the resources in the core network 308 for each slice may include slice-specific physical and/or virtual network functions and common network functions that are shared by multiple slices. Isolation of the network slices may include, for example, bandwidth isolation, data isolation, and processing isolation.

As above, however, upon the occurrence of a FAFO event, even though the network slices may be isolated, the network functions associated with one or more of the network slices may be impaired, thereby at best limiting the availability of resources used for the network slice and reducing the performance of the network slice. To mitigate this, a quarantine set of network functions may be implemented in the network that are entirely isolated from other network functions. The quarantine set of network functions may be implemented to contain the functionality affected by the FAFO event, permit rapid restoration of the affected network slices, and provide a set of services (which may or may not satisfy QoS requirements of specific services) to at least some of the affected UEs.

To effect multi-faceted containment control, a combination of physical and virtual network functions may be used to implement network segmentation and quarantine network slices (or subnets) affected by the FAFO event. Quarantine PNFs (QPNFs) may be built into physical network equipment such as routers and gateways that bridge RANs, core networks, and communication services networks. Quarantine VNFs (QVNFs) may perform a similar function as QPNFs, except at the software-defined network layers including slice, slice-subnets, and infrastructure overlays (INF). The QPNFs and QVNFs may be entirely isolated from the PNFs and VNFs of the network, but may reside in the same physical devices as the PNFs and VNFs of the network (and use the same or isolated firmware within those devices) and/or may reside in different physical devices as the PNFs and VNFs of the network.

QPNFs and QVNFs may be controlled by a network side-channel. The network side-channel may be a dedicated control network or a software-defined control network. The network side-channel may use QoS and resource reservation mechanisms to define a high priority, low data rate, but low latency channel referred to as a Quarantine Control Network (QCN). In some embodiments, each VNF may have a corresponding QVNF that runs on the QCN. The QCN may be built into the IMT network fabric such that all network resources are QCN-aware and capable.

The sentinels are used to control the QPNFs and QVNFs (also referred to as QxNFs). The sentinels may have privileged access to the QCN and QxNFs and may be implemented for one or multiple network slices or subnets. FAFO sensors may be used to gather FAFO information to provide the FAFO intelligence to the sentinels, which use the FAFO intelligence to predict the onset of failure or potential onset of failure (whether malicious or accidental). The sensors may detect FAFO events such as a sudden, unexpected change in performance measures such as increase in latency or number of radio link failures/repeat requests/link re-establishments, decrease in QoS etc.

Similar to the RICs described above, the sentinels may use deep learning/AI models may be used to predict the potential onset/onset of network failure or portions of the network—e.g., network slices. In other embodiments, the sentinels may provide the FAFO information to a central location for analysis by the AI model and control the QxNFs based on a response from the central location that is dependent on the classification provided by the AI model for the FAFO and the QxNFs associated with the sentinel.

The sentinels may be implemented in the RANs, and/or may be provided by functionality within the core network. Each sentinel may thus be able to use the FAFO intelligence to determine whether the change in performance measurements is expected (e.g., an event at an arena) or whether the change signals a FAFO event. In some embodiments, the sentinels may be used to categorize the detected events of the FAFO sensors as FAFO events, categorize the severity of the FAFO event and probable outcome of the FAFO event, and respond to FAFO events. The AI model may be used to provide a series of escalations in response to increasing severity of the network failure. The escalations include, among others, increasing limitations on services provided by the network slices or subnets (e.g., partial quarantine) or increasing transfer of service among network slices (and resources) to be quarantined to network slices (and resources) that are able to remain unquarantined.

In some embodiments, one or more of the QPNFs, sentinels and FAFO sensors can each be deployed to higher level network abstraction layers such as a composite network service (CNS) instance or an INF instance. CNS instances may be implemented using a cloud network and edge network. QPNFs may be strategically deployed at the interface points where CNSs overlap. For example, network slice 1, to which a QPNF/sentinel/FAFO sensor is deployed may be a shared network slice involving multiple CNS instances. Dedicated network slice instances may have a physical network access component that is essentially guarded by one or more QPNFs. Each QPNF may have various functionalities selected from an available library of functionality for providing the desired characteristics of the QPNF.

As above, sentinels may be distributed control logic nodes. In some embodiments, the sentinels may operate independent of a central or main sentinel, while in other embodiments a central sentinel may be used that provides the AI modeling of the events. In the former case, sentinel-to-sentinel communication may occur over the QCN fabric to ensure security. The security (e.g., encryption) over the QCN fabric may be similar to that in the network being monitored; alternatively, the security may be different over the QCN fabric (e.g., different/higher level encryption). Sentinels may share/relay FAFO intelligence or may individually process FAFO intelligence into a containment strategy for the one or more particular network slices/subnets associated with the sentinel. The containment strategy may identify a topology of the affected network that is to be targeted for quarantine to provide a safety net. The safety net may be mapped to the various QxNF deployments, which may be subsequently signaled to close a perimeter of the safety net. Quarantine may thus be used to prevent outbreak among the network slices or subnets or, if some of the network slices or subnets have already suffered an outage, protect other resources in the network from further outbreak.

Figure 4:
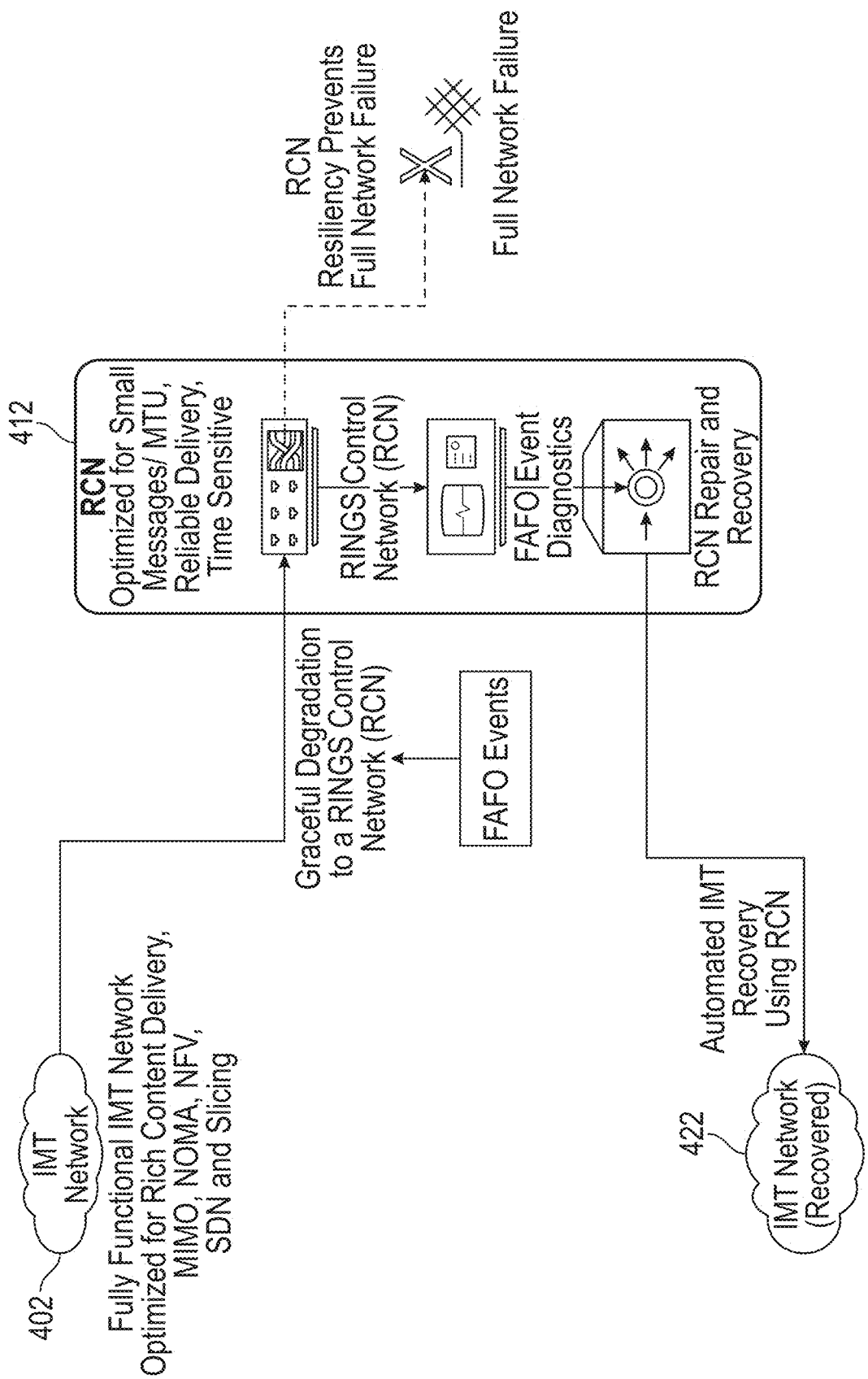
FIG. 4 illustrates system operation, according to an example.

FIG. 4 illustrates system operation in accordance with some embodiments. As shown, the QCN may operate over a Resiliency Control Network (RCN) 412 which may operate in tandem with a fully functional International Mobile Telecommunications (IMT) network 402. The IMT network 402 may be optimized for rich content delivery, employing Multiple-input/multiple-output (MIMO), non-orthogonal multiple access (NOMA), NFV, self-organizing network (SON), and network slicing among others.

The RCN 412, on the other hand, may be optimized for reliable delivery of small messages in a time-sensitive manner. The RCN 412 may contain multiple components as above to prevent full network failure, including AI modeling to provide diagnostics for FAFO events detected by the FAFO sensors and provided to the sentinels, as well as to determine repair and recovery of the IMT 402 undergoing FAFO events to provide a recovered IMT network 422.

The QCN operates over one or more of the Open Systems Interconnection (OSI) model layers, to permit FAFO-aware resource scheduling to be used by the different layers. For example, FAFO-aware resource scheduling may be used at the data link (L2) layer. The resource selection may include frequency hopping, as well as the use of multiple channels, links, or radio access technologies (RATs) to add redundant resources for a particular path or network slice. The use of such alternate resources (as well as selection of one or more of the resources) may increase the difficulty for an attacker (if any is associated with the FAFO event) to follow or attack when the QCN is used to provide services, and thus increase the security of the QCN.

The QCN may also reroute compromised paths of the quarantined network or add one or more redundant paths provided by the network layer (L3). The PHY layer (L1) may be used to select different channels or transmission techniques, select different RAT at middleware or at the MAC-Network SHIM, select different Edge/Compute at middleware, etc. The resource selection techniques may permit sensitive or high-priority data to be secured over at least one secure/non-attacked resource—that is a secure link, path, or RAT provided by the QCN or out of the non-quarantined resources of the network.

If the sentinels detect a threat in a particular segment such as RAN segment (i.e., at a RAN, such as an eNB or gNB) or network slice, the sentinels provide a mechanism to quarantine the affected portions of the network and stop the threat from spreading to other segments, such as core segment (e.g., an AMF), or other network slices. Upon threat detection in one segment or slice, as determined by the AI model, other segments and network slices are notified of the threat so that in addition to the QPNF and QVNF taking actions to quarantine and initiate network recovery, the other segments or network slices can take proactive actions.

In some embodiments, the QCN or network may take action in response to detection of a FAFO event triggered by an attacker. Once the QCN determines that an attacker is interfering with a channel, one technique to stop the attacking transmission is to piggy-back on fault-containment protocols to induce errors into the transmission. Consequently, the attacker incurs transmission errors and is likely to halt the attacking transmissions. To effectively piggy-back on fault-containment protocols, isolation exists between hardware and software. That is, when the firmware of a device is compromised, the hardware may provide independent fault-containment that cannot be tampered with. The fault-containment mechanism may operate independently in a lower OSI layer (out of reach of firmware). Simultaneously, a collective effort to avoid a compromised node or segment (e.g., RAN node) compromised by the attack may be triggered by the QCN to route traffic around the node, therefore increasing resiliency of the network.

The QPNF and QCN may be part of an Infrastructure Processing Unit (IPU) and are included as part of a switching architecture (bare metal—e.g., switches). When an attack is detected or predicted, the VNFs running on nodes under attack may be bypassed (including resource intensive functionalities). In addition, the traffic that was running on the affected network may ping-pong among the bare metal elements of the network (IPU+switches) until the end of the traffic is reached. The bare metal elements of the network implement the QCN as well as minimal functionalities that the network functions use to implement communication protocols. Thus, in response to detection of an attack, the above quarantine and countermeasure functions may be initiated. The traffic may be managed by the infrastructure with anticipated functionalities, such as load balancing and proxy services, allowing the traffic to continue to flow. This functionality may continue until the network is restored to operation, in which case the functionality provided by the QCN may be terminated and the normal flow through the network reinstated. In the above embodiment, which is based on IPU and infrastructure of the QCN, the functionality may be preloaded onto the hardware for resiliency.

In some embodiments, the QCN may provide the ability to handle a surge in traffic. In this case, the surge capacity may be drawn from a flexible, pre-allocated set of resources supplied by one or more providers. The pre-allocated set of resources can be used to create a secondary underlay resource pool. In this case, the secondary underlay resource pool may be used to provide continued active monitoring and mirroring of critical data, as well as at least minimal functionality during quarantine operations. The secondary underlay resource pool may be used to override a desired resource allocation for an application or UE until the network has been restored. In addition to potentially reduced functionality, overriding of the resource allocation may result in delaying the availability of the resource pool for non-critical applications or UEs in favor of critical applications or UEs.

Slice resources allocated to the QCN are isolated by pre-allocating the various QCN resources. This may achieve a level of redundancy that provides adequate resource pooling to support recovery and to avoid burst recovery starvation scenarios. In burst recovery starvation scenarios, recovery actions may over-allocate available resources to effect recovery, which may inadvertently cause new FAFO events to occur and that may then be followed by cascaded new failures. Pre-allocated resources are identified as part of the resource domain pre-determined to be available to the QCN. The pre-allocated resources may be exclusive to the QCN. Operators may allocate QCN resources in a secured environment, such as a trusted execution environment (Software Guard Extension (SGX) or some other area on the main processor of a device that is separated from the system's main operating system (OS)). The use of a secured environment ensures that data is securely stored, processed and protected, and that resources are maintained for the quarantined environment until the network is stable.

Resiliency is understood in the context of FAFO events where introduction of FAFO events may result in degradation of the IMT network, full network failure, or blackout. IMT (or other) networks that provide such resiliency may avoid a worst case scenario of manual rebuilding due to the FAFO events. Network slicing may be provided to ensure resilient, autonomous, reliable, and available networks. One aspect of network slicing is the formation of a dedicated network, where resources are able to run in a trusted execution environment, if available. Such resources may be optimized for resiliency recovery and for FAFO event detection, prediction, and prevention using the RCN 412 in FIG. 4. In particular, the RCN 412 may offer End-to-End resiliency, as well as availability for Core, Edge and RAN segments (i.e., core elements, edge elements, and RANs) of the network.

Resiliency options provided by the RCN 412 can be developed at single protocol layer or across multiple protocol layers. The availability of the resiliency options may be dependent on service level agreements (SLAs) of the IMT network 402 and other networks associated with the RCN 412. In some cases, dedicated protection may be provided within a particular network slice, or such protection may be shared restoration across network slices. SLAs can contain requirements to run on the RCN 412.

Figure 5:
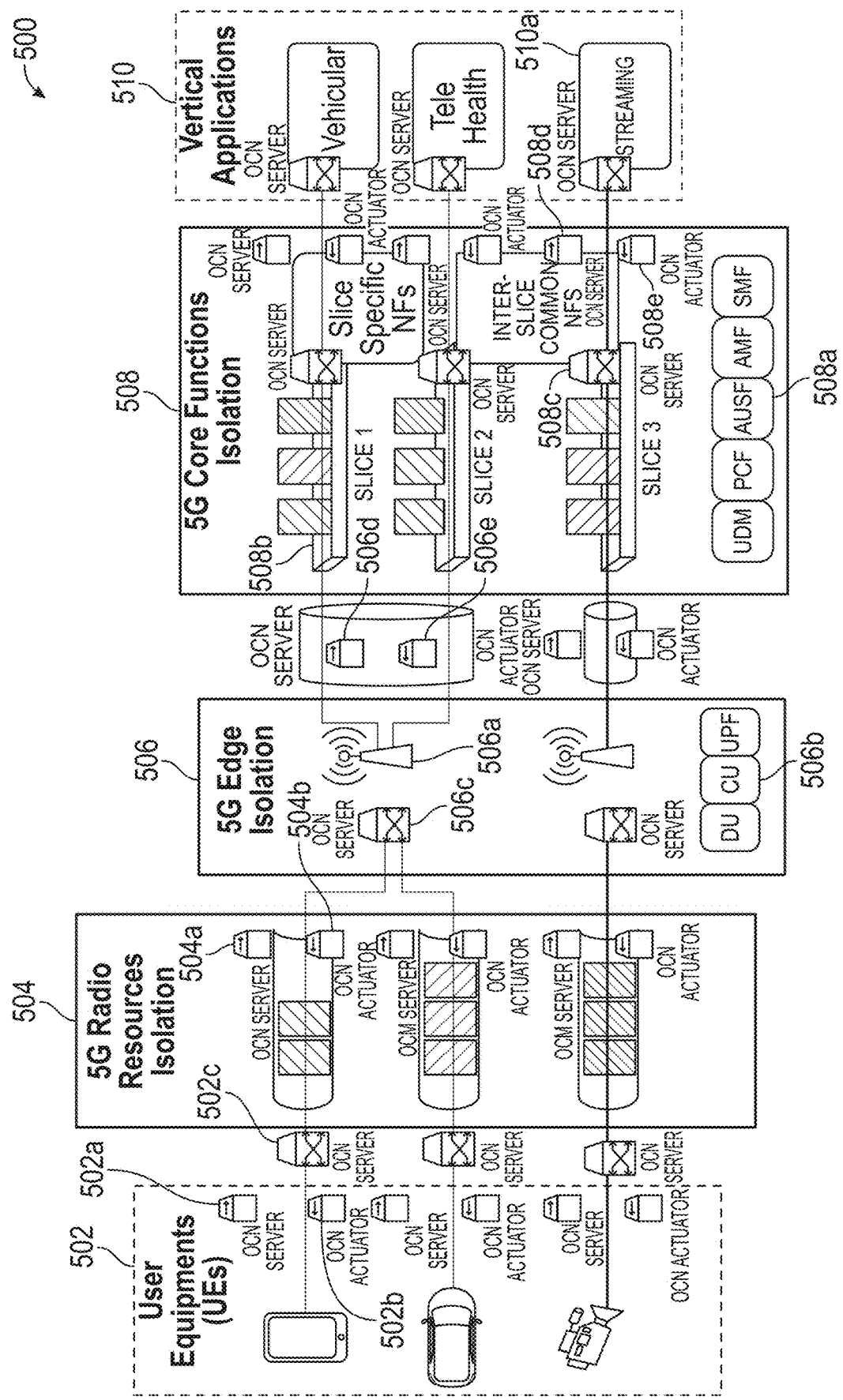
FIG. 5 illustrates a quarantine control network (QCN) in accordance with some embodiments.

FIG. 5 illustrates a Quarantine Control Network (QCN) in accordance with some embodiments. The QCN 500 in FIG. 5 is shown in a 5G system. The QCN 500 may be an overlay network on top of an RCN such as the RCN shown in FIG. 4. The RCN may operate in tandem with a fully functional IMT network.

Similar to the network 300 of FIG. 3, a number of networks elements in FIG. 5 are not shown for convenience. One or more UEs 502 are coupled to 5G radio resources isolation 504. The UEs 502 may include mobile devices, vehicular devices, and other devices (e.g., streaming devices). Each UE 502 may have a UE QCN sensor 502a and UE QCN actuator 502b to control QxNFs associated with the UE 502. The UE QCN sensor 502a and UE QCN actuator 502b may be separate from the UE 502 associated with the UE QCN sensor 502a and UE QCN actuator 502b. Each UE QCN sensor 502a and UE QCN actuator 502b may be associated with a UE QCN sentinel 502c. The UE QCN sentinel 502c may be in the same device as the UE QCN sensor 502a and UE QCN actuator 502b or at least one of the UE QCN sensor 502a, UE QCN actuator 502b, and UE QCN sentinel 502c may be in different device.

As shown, the communications from each UE 502 are isolated from each other to provide 5G Radio Resource isolation 504. The resources of each radio link may be dedicated to that radio link. Each radio link may have a radio resource QCN sensor 504a and radio resource QCN actuator 504b to control QxNFs associated with the radio link.

Each radio resource QCN sensor 504a and radio resource QCN actuator 504b may be associated with an Edge QCN sentinel 506c that is associated with 5G Edge network isolation 506 in a 5G edge network. The Edge QCN sentinel 506c may be in the same device as the radio resource QCN sensor 504a and radio resource QCN actuator 504b or at least one of the radio resource QCN sensor 504a, radio resource QCN actuator 504b, and Edge QCN sentinel 506c may be in different device. The 5G edge network may include one or more gNBs 506a of the 5G network. The gNBs 506a may include components 506b such as a DU and CU in communication with a UPF. Each Edge QCN sentinel 506c may be associated with and may be disposed in a different gNB 506a.

The 5G Edge network may be connected with a 5G core network that provides 5G core functions isolation 508. An individual QCN sensor 506d and QCN actuator 506e may be associated with a link between the 5G edge network and a 5G core network (and thus individual gNBs 506a). The Edge QCN sentinel 506c may be in the same device as the QCN sensor 504a and QCN actuator 504b or at least one of the radio resource QCN sensor 504a, radio resource QCN actuator 504b, and Edge QCN sentinel 506c may be in different device. The 5G edge network may include one or more gNBs 506a of the 5G network.

The 5G core network may contain the 5G core functionality (e.g., UDM, PCF, AUSF, AMF, SMF) 508a described in relation to FIGS. 1A-1C. The 5G core functionality may be implemented by QxNFs, as above. The 5G core functionality may include both slice-specific network functions and inter-slice common network functions that provide functionality to multiple network slices. The 5G core functions isolation 508 may be provide by different network slices 508b. Each network slice 508b may be associated with a different service, and have different service characteristics (e.g., QoS). Each network slice 508b may be associated with a different core QCN sentinel 508c, as well as a different core QCN sensor 508d and radio resource QCN actuator 508e.

The 5G core network may be connected with servers that provide different vertical applications 510, shown in FIG. 5 as vehicular applications, tele-health applications, and streaming applications, although such applications are not exclusive. Each network slice 508a may deliver data for a single application, the latter of which may be associated with an individual application QCN sentinel 510a. Thus, as shown, the QCN sensors, QCN actuators, and QCN sentinels are distributed throughout the QCN 500 to provide the described functionality.

The QCN functionality may provide integrated monitoring. The integrated monitoring may include modules that provide different functionalities, such as FAFO detection and prediction, and discovery and maintenance of resiliency/redundancy resources, paths, links, RATs, and compute options. Such monitoring may have components at each segment (e.g., RAN, core) and multiple protocol layers of each segment.

In addition, the QCN functionality may include cross-slice and cross-segment coordination. Such coordination may include sharing information such as FAFO detection/prediction across different network slices and segments for coordinated actions to handle FAFO events. Information about actions taken to handle FAFO events can also be shared and coordinated across the different network slices and segments.

Selection of actions for FAFO recovery may also be part of the QCN functionality. Such decisions may be distributed yet coordinated at multiple network slice layers and across multiple network segments within a network slice. Multi-layer examples may include those provided above, such as: FAFO-aware resource scheduling at L2 that may include frequency hopping, adding redundant transmission resource through different channels, using different links or RATs, and use duplicate transmissions over multiple links/resources. The FAFO-aware resource scheduling may make resource selection difficult to follow by an attacker. In addition, sensitive, high-priority data may be securely provided over one or more secure (or non-attacked) links, paths, or RATs; rerouting of paths or adding redundant paths at the network layer; selection of different channel or transmission techniques at the PHY layer; selecting different RAT at middleware or at MAC-Network SHIM; and selecting different Edge/Compute facilities at the middleware of a device. This permits a detected threat in one segment to be quarantined to stop the threat from spreading to another segment or network slice.

In response to determining that an attacker is interfering with a channel, fault-containment mechanisms of the QCN may be used to induce errors into the attacker's transmission to terminate the transmission. This assumes that a level of isolation is present between hardware and software of the affected segment. For example, when the firmware of a device is compromised, the hardware of the device may provide independent fault-containment that cannot be tampered with. Simultaneously, a collective effort among QCN sentinels may be used to avoid (route around) a compromised node.

Each ITM may generate knowledge that can be leveraged and shared across the various ITMs in order to create an augmented strategy to identify attacks or misbehaviors across each system. This knowledge may be used by the AI model to both: derive stronger methods to identify common attacks that happen to different ITMs as different ITMs may have slightly different behaviors for the same attacks (which may make the overall AI learning stronger), and infer and share behaviors to attacks that occur more frequently in specific ITMs than in other ITMs to permit crowd sourced-learning, for the AI model, of FAFO behavior and remedies in different IMTs.

Figure 6:
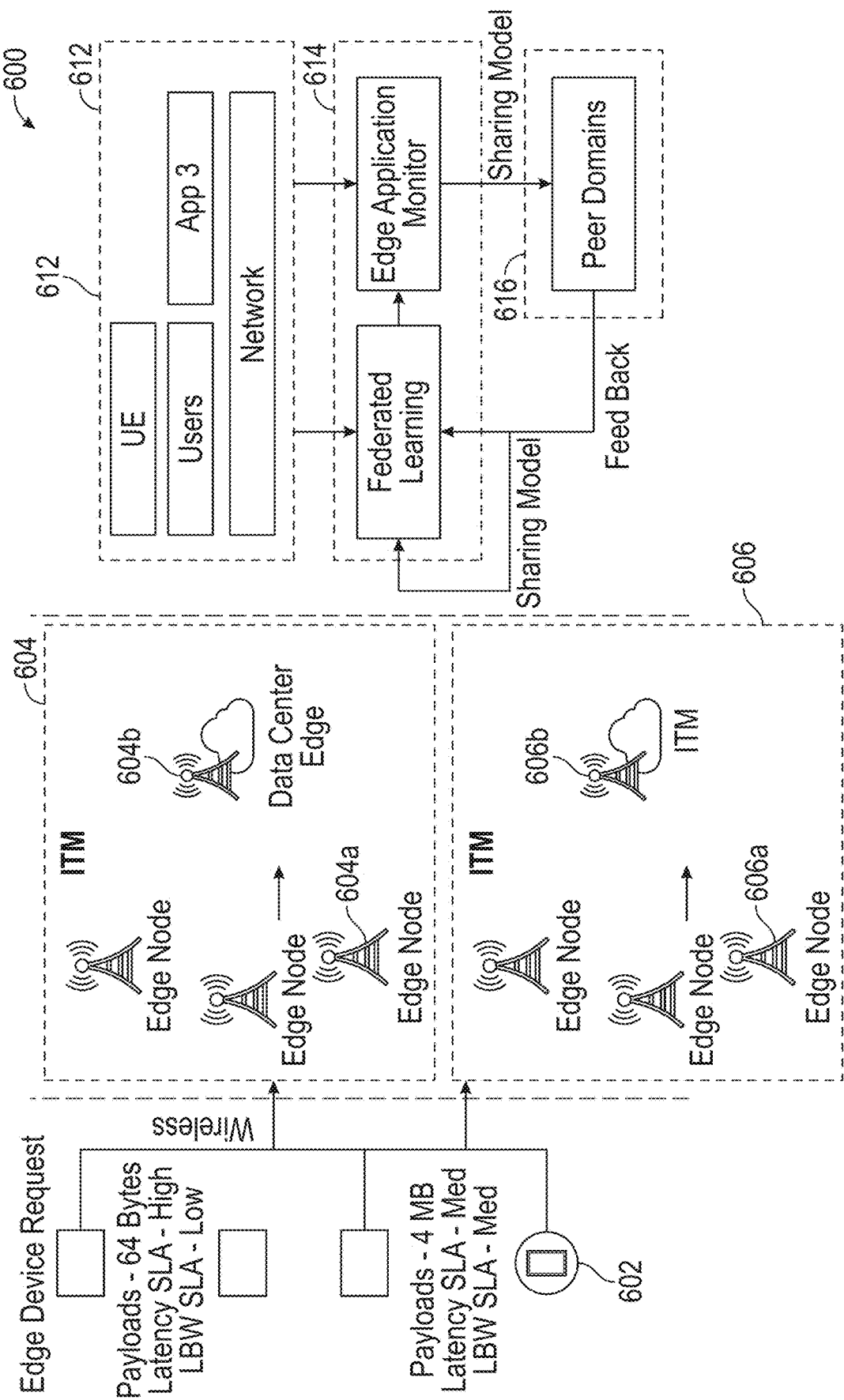
FIG. 6 illustrates a data flow in a system, according to an example.

FIG. 6 illustrates a data flow in a system. The system 600 includes UEs 602 in an Edge network that transmit requests to multiple ITMs 604, 606. As shown, the characteristics of the data from the UEs 602 may be different in terms of payload sizes, latency, and bandwidth. For example, the payloads of data from IoT devices may be low (e.g., 64 bytes), the latency for the data (indicated by the SLA) may be high, and the bandwidth provided for the data may be low (indicated by the SLA), while for tele-med applications, the payloads may be much higher (e.g., 4 MB), the latency for the data (indicated by the SLA) may be medium, and the bandwidth provided for the data may be medium (indicated by the SLA). The data from some of the UEs 602 may be received at Edge nodes (gNBs) 604a in one of the ITMs 604 and then provided to one or more data center Edge equipment 604b. Similarly, data from others of the UEs 602 may be received at Edge nodes (gNBs) 606a in another of the ITMs 606 and then provided to one or more other ITMs 606b.

Information from the components of a particular ITM 612 may be supplied to the QCN 614. As shown, the information may be monitored in a QCN Edge application monitor and be provided to a federated learning module of the AI model. The AI model (or information from the AI model) may be shared to peer domains 616 (i.e., across the ITMs 604). The peer domains 616 may provide feedback to the federated learning module, which then controls the monitoring in the QCN 614.

In some embodiments, the ITM 612 may track the N last events that are related to a particular UE/User or service access to the ITM 612. The N events may be events that occur across various hops that the packets cross. The events may occur in a variety of elements such as physical network elements, for example switches and gateways, and software elements, for example Multiprotocol Label Switching (MPLS) virtual routers. Events may include, but are not limited to type of flow, payload, and telemetry for the hop being traversed. The N events can be stored in a centralized FAFO event tracker. If the ITM 612 detects an attack, the type of attack may be determined and the information stored in the centralized FAFO event tracker may be associated with the type of attack—that is, the type of attack may be added to the information at the hop. In some embodiments, specific pieces of the information may be stored in a pooled event tracker for a predetermined duration. The information stored in the pooled event tracker may include both the telemetry and attack type at the hop. After M events, the ITM 612 may provide the information to perform opportunistic training of the AI model as the resources of the ITM are reduced. New models may be trained and shared with the other ITMs.

One aspect of intelligent resilience in ITM networks is whether the elements being trained are to agree on how models are defined and trained. This implies agreement on two major aspects of ITM node deployment: the elements that are to be monitored and the type of telemetry data to be captured during training, and the type of attacks to be detected by the AI model as well as the manner to define the training methods of the AI model.

One example of usage of the QCN with network caching is fast start of the ITM. Fast start of a network after network collapse due to the occurrence of a FAFO event is desirable for content distribution and large-scale data sharing for stable information bases. For fast starts, VNFs that serve purely as lookup or streaming stores over cached contents may only be shut down and restarted elsewhere by the QVNFs upon the QCN sentinels indicating cache access failures, corrupted data, etc. The restarted (new instance of) VNF at an alternate location that is not affected by a FAFO event may simply fill up its cache from the origin servers, with very low downtime. The restarted VNF may also receive a cache digest (a directory of names of contents) that is created from time to time by a previous instance of a content-serving VNF, and use the cache digest to prefill its cache as soon as the new instance is available. In this case, the QCN may captures a ref-count over the restarted instances so that the QCN does not restart multiple new instances, and so that the QCN does not have to resolve contention among the multiple instances about which of the instances has the legitimate copy of contents.

Implementation in Edge Computing Scenarios

It will be understood that the techniques above may be integrated with many aspects of edge computing strategies and deployments. Edge computing, at a general level, refers to the transition of compute and storage resources closer to endpoint devices (e.g., consumer computing devices, user equipment, etc.) to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

In the context of satellite communication networks, edge computing operations may occur, as discussed above, by moving workloads onto compute equipment at satellite vehicles; using satellite connections to offer backup or (redundant) links and connections to lower-latency services; coordinating workload processing operations at terrestrial access points or base stations; providing data and content via satellite networks; and the like. Thus, many of the same edge computing scenarios that are described below for mobile networks and mobile client devices are equally applicable when using a non-terrestrial network.

Figure 7:
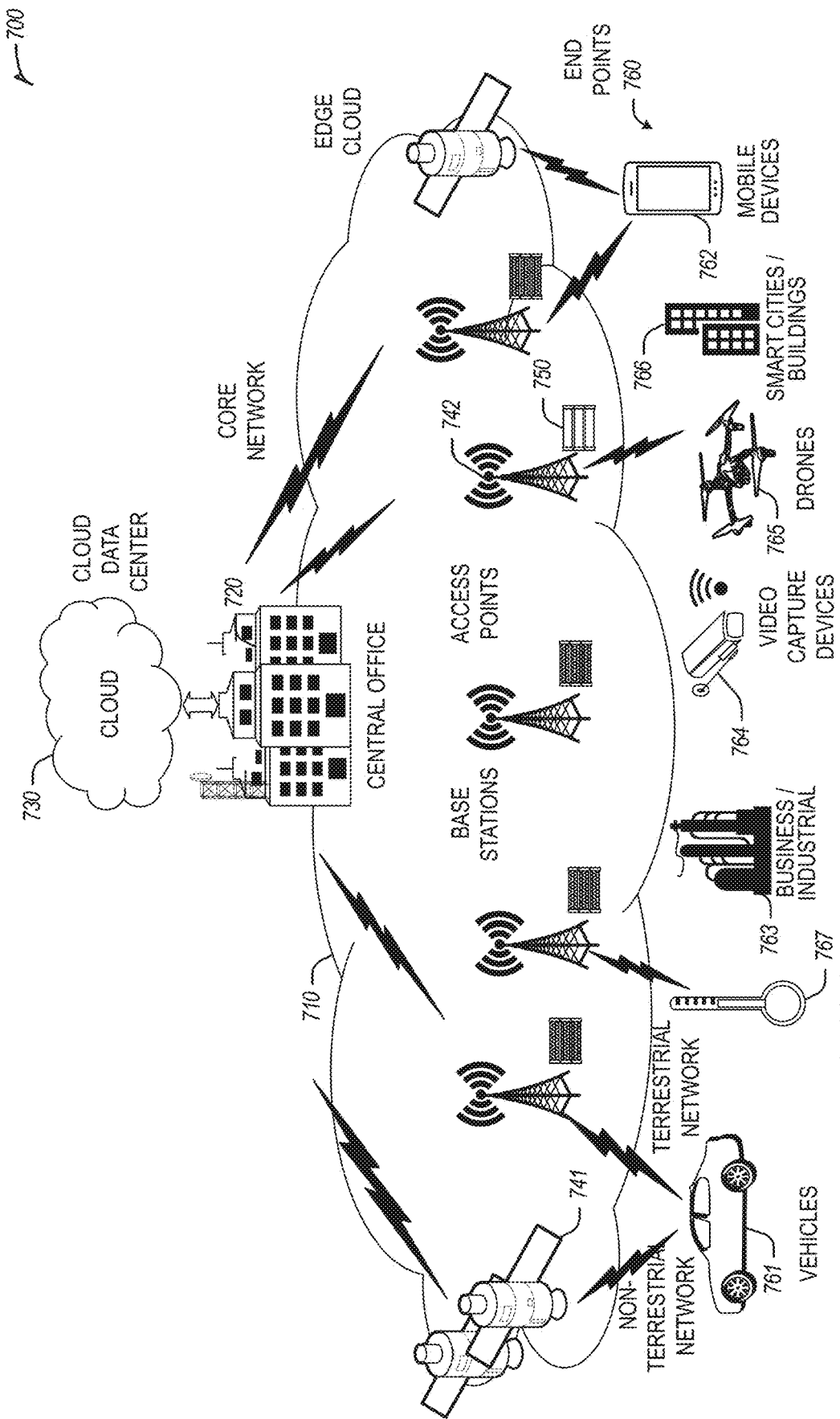
FIG. 7 illustrates an overview of an edge cloud configuration for edge computing, according to an example.

FIG. 7 is a block diagram 700 showing an overview of a configuration for edge computing, which includes a layer of processing referenced in many of the current examples as an "edge cloud". This network topology, which may include several conventional networking layers (including those not shown herein), may be extended through the use of the satellite and non-terrestrial network communication arrangements discussed herein.

As shown, the edge cloud 710 is co-located at an edge location, such as a satellite vehicle 741, a base station 742, a local processing hub 750, or a central office 720, and thus may include multiple entities, devices, and equipment instances. The edge cloud 710 is located much closer to the endpoint (consumer and producer) data sources 760 (e.g., autonomous vehicles 761, user equipment 762, business and industrial equipment 763, video capture devices 764, drones 765, smart cities, and building devices 766, sensors and IoT devices 767, etc.) than the cloud data center 730. Compute, memory, and storage resources which are offered at the edges in the edge cloud 710 are critical to providing ultra-low or improved latency response times for services and functions used by the endpoint data sources 760 as well as reduce network backhaul traffic from the edge cloud 710 toward cloud data center 730 thus improving energy consumption and overall network usages among other benefits.

Compute, memory, and storage are scarce resources, and generally decrease depending on the edge location (e.g., fewer processing resources being available at consumer end point devices than at a base station or a central office). However, the closer that the edge location is to the endpoint (e.g., UEs), the more that space and power are constrained. Thus, edge computing, as a general design principle, attempts to minimize the number of resources needed for network services, through the distribution of more resources that are located closer both geographically and in-network access time. In the scenario of the non-terrestrial network, distance and latency may be far from the satellite, but data processing may be better accomplished at edge computing hardware in the satellite vehicle rather than requiring additional data connections and network backhaul to and from the cloud.

In an example, an edge cloud architecture extends beyond typical deployment limitations to address restrictions that some network operators or service providers may have in their infrastructures. These include a variety of configurations based on the edge location (because edges at abase station level, for instance, may have more constrained performance); configurations based on the type of compute, memory, storage, fabric, acceleration, or like resources available to edge locations, tiers of locations, or groups of locations, the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to the end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Likewise, within edge computing deployments, there may be scenarios in services in which the compute resource will be "moved" to the data, as well as scenarios in which the data will be "moved" to the compute resource. Or as an example, a base station (or satellite vehicle) compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle.

Figure 9:
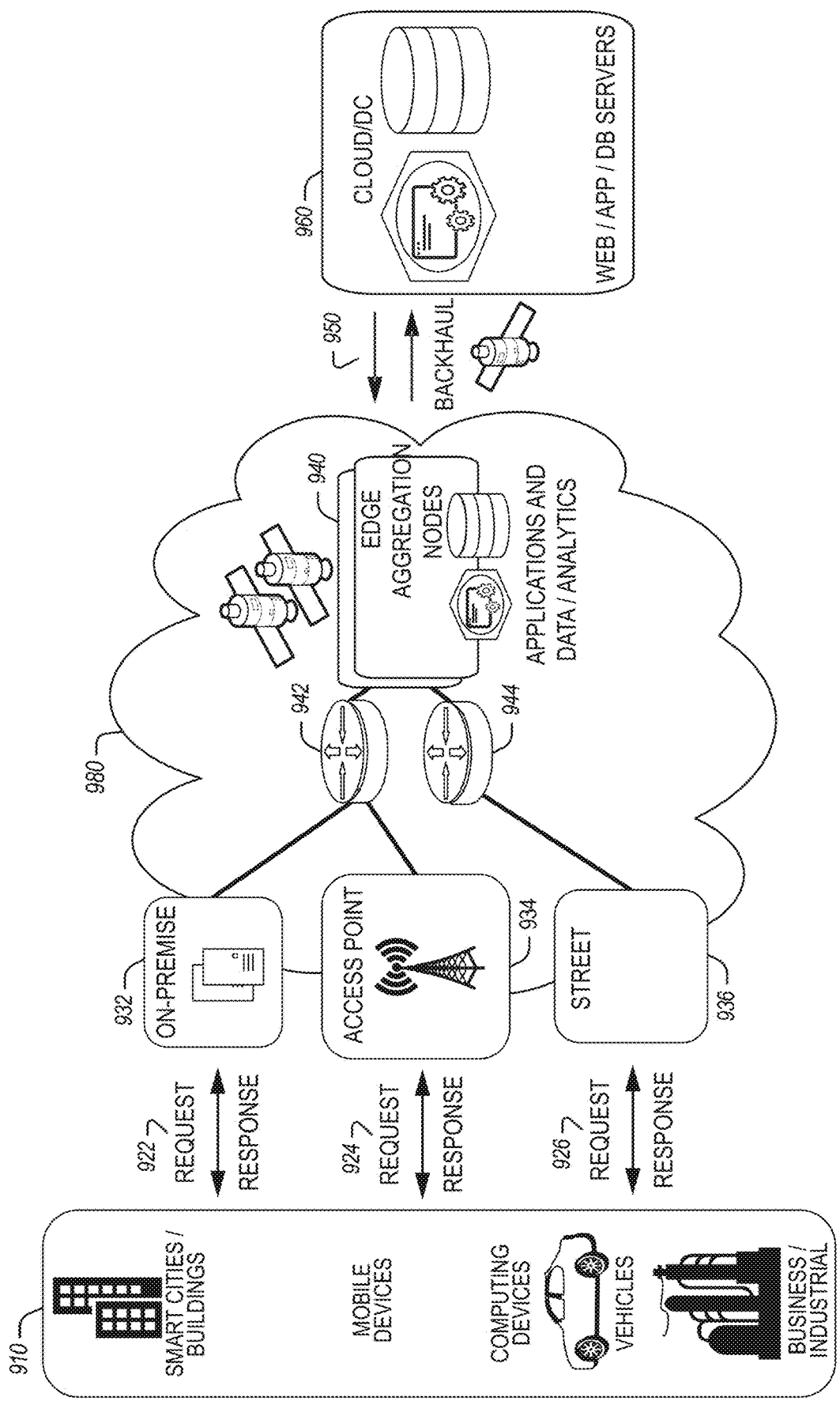
FIG. 9 illustrates operational layers among endpoints, an edge cloud, and cloud computing environments, according to an example.

In contrast to the network architecture of FIG. 9, traditional endpoint (e.g., UE, vehicle-to-vehicle (V2V), vehicle-to-everything (V2X), etc.) applications are reliant on local devices or remote cloud data storage and processing to exchange and coordinate information. A cloud data arrangement allows for long-term data collection and storage but is not optimal for highly time-varying data, such as a collision, traffic light change, etc., and may fail in attempting to meet latency challenges. The extension of satellite capabilities within an edge computing network provides even more possible permutations of managing compute, data, bandwidth, resources, service levels, and the like.

Depending on the real-time requirements in a communications context, a hierarchical structure of data processing and storage nodes may be defined in an edge computing deployment involving satellite connectivity. For example, such a deployment may include local ultra-low-latency processing, regional storage, and processing as well as remote cloud data-center-based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally to meet latency requirements. Higher layer data such as Application Layer data is typically less time-critical and may be stored and processed in a remote cloud data center.

Figure 8:
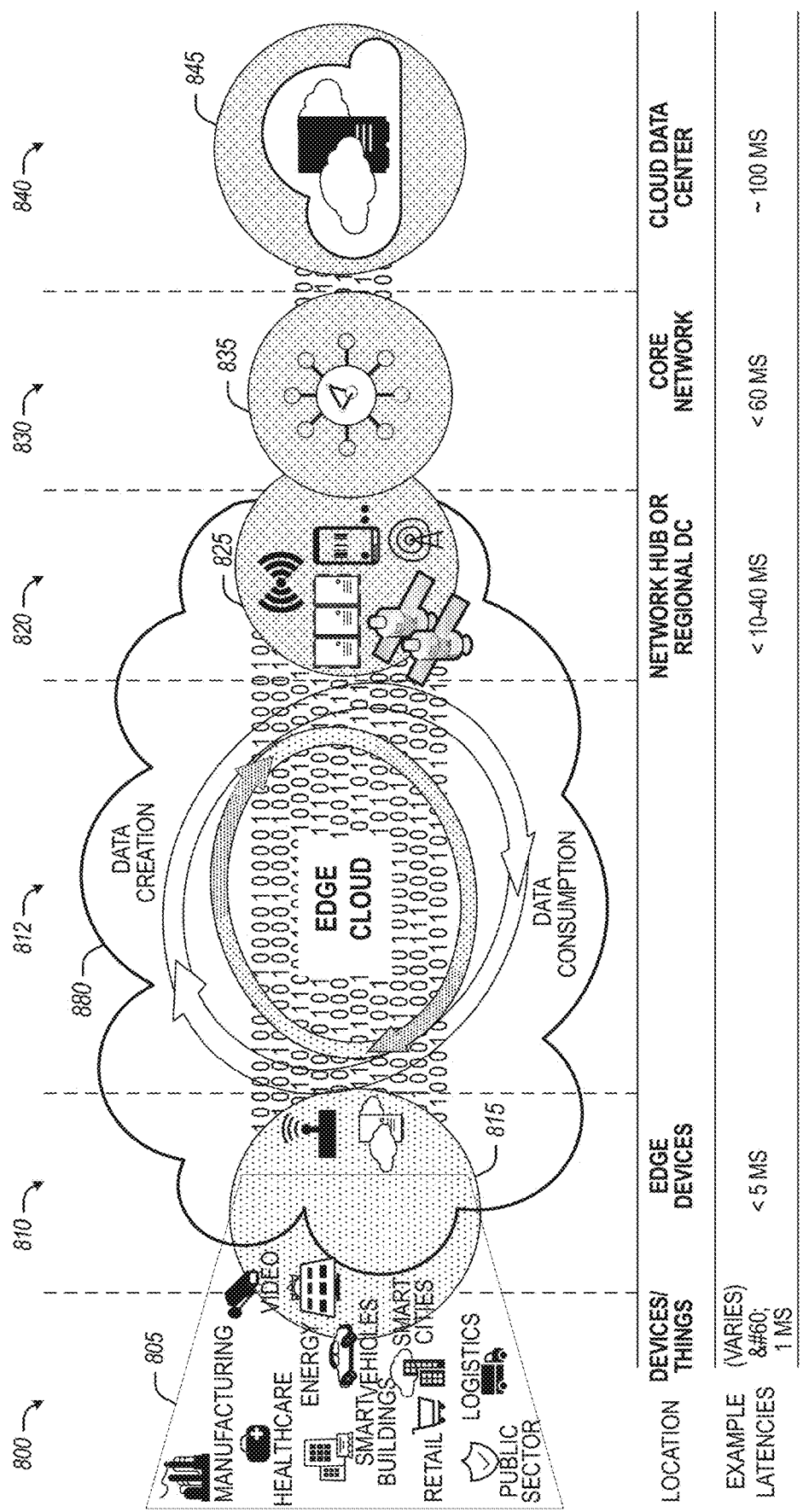
FIG. 8 illustrates an overview of layers of distributed compute deployed among an edge computing system, according to an example.

FIG. 8 illustrates operational layers among endpoints, an edge cloud, and cloud computing environments. Specifically, FIG. 8 depicts examples of computational use cases 805, utilizing the edge cloud 880 among multiple illustrative layers of network computing. The layers begin at an endpoint (devices and things) layer 800, which accesses the edge cloud 880 to conduct data creation, analysis, and data consumption activities. The edge cloud 880 may span multiple network layers, such as an edge devices layer 810 having gateways, on-premise servers, or network equipment (nodes 815) located in physically proximate edge systems; a network access layer 820, encompassing base stations, radio processing units, network hubs, regional data centers (DC), or local network equipment (equipment 825); and any equipment, devices, or nodes located therebetween (in layer 812, not illustrated in detail). The network communications within the edge cloud 880 and among the various layers may occur via any number of wired or wireless mediums, including via connectivity architectures and technologies not depicted.

Examples of latency with terrestrial networks, resulting from network communication distance and processing time constraints, may range from less than a millisecond (ms) when among the endpoint layer 800, under 5 ms at the edge devices layer 810, to even between 10 to 40 ms when communicating with nodes at the network access layer 820. (Variation to these latencies is expected with the use of non-terrestrial networks). Beyond the edge cloud, 810 are core network 830 and cloud data center 840 layers, each with increasing latency (e.g., between 50-60 ms at the core network layer 830, to 100 or more ms at the cloud data center layer). As a result, operations at a core network data center 835 or a cloud data center 845, with latencies of at least 50 to 100 ms or more, will not be able to accomplish many time-critical functions of the use cases 805. Each of these latency values is provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 835 or a cloud data center 845, a central office or content data network may be considered as being located within a "near edge" layer ("near" to the cloud, having high latency values when communicating with the devices and endpoints of the use cases 805), whereas an access point, base station, on-premise server, or network gateway may be considered as located within a "far edge" layer ("far" from the cloud, having low latency values when communicating with the devices and endpoints of the use cases 805). It will be understood that other categorizations of a particular network layer as constituting a "close", "local", "near", "middle", or "far" edge may be based on latency, distance, a number of network hops, or other measurable characteristics, as measured from a source in any of the network layers 800-840.

The various use cases 805 may access resources under usage pressure from incoming streams, due to multiple services utilizing the edge cloud. To achieve results with low latency, the services executed within the edge cloud 880 balance varying requirements in terms of (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may tolerate an occasional failure, depending on the application); and (c) Physical constraints (e.g., power, cooling, and form-factor).

The end-to-end service view for these use cases involves the concept of a service flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real-time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 880 may provide the ability to serve and respond to multiple applications of the use cases 805 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), etc.), which cannot leverage conventional cloud computing due to latency or other limitations. This is especially relevant for applications that require connection via satellite, and the additional latency that trips via satellite would require to the cloud.

However, with the advantages of edge computing come the following caveats. The devices located at the edge are often resource-constrained and therefore there is pressure on the usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 880 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 880 (network layers 800-840), which provide coordination from the client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, circuitry, device, appliance, or other things capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 880.

As such, the edge cloud 880 is formed from network components and functional features operated by and within edge gateway nodes, edge aggregation nodes, or other edge compute nodes among network layers 810-830. The edge cloud 880 thus may be embodied as any type of network that provides edge computing and/or storage resources that are proximately located to radio access network (RAN) capable endpoint devices (e.g., mobile computing devices, IoT devices, smart devices, etc.), which are discussed herein. In other words, the edge cloud 880 may be envisioned as an "edge" that connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 880 may be servers, multi-tenant servers, appliance computing devices, and/or any other type of computing device. For example, a node of the edge cloud 880 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input device such as user interface hardware (e.g., buttons, switches, dials, sliders, etc.). In some circumstances, example housings include output devices contained in, carried by, embedded therein, and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent of other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 11B. The edge cloud 880 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code, or scripts may execute while being isolated from one or more other applications, software, code, or scripts.

In FIG. 9, various client endpoints 910 (in the form of mobile devices, computers, autonomous vehicles, business computing equipment, industrial processing equipment) exchange requests and responses that are specific to the type of endpoint network aggregation. For instance, client endpoints 910 may obtain network access via a wired broadband network, by exchanging requests and responses 922 through an on-premise network system 932. Some client endpoints 910, such as mobile computing devices, may obtain network access via a wireless broadband network, by exchanging requests and responses 924 through an access point (e.g., cellular network tower) 934. Some client endpoints 910, such as autonomous vehicles may obtain network access for requests and responses 926 via a wireless vehicular network through a street-located network system 936. However, regardless of the type of network access, the TSP may deploy aggregation points 942, 944 within the edge cloud 980 to aggregate traffic and requests. Thus, within the edge cloud 980, the TSP may deploy various compute and storage resources, such as at edge aggregation nodes 940 (including those located at satellite vehicles), to provide requested content. The edge aggregation nodes 940 and other systems of the edge cloud 980 are connected to a cloud or data center 960, which uses a backhaul network 950 (such as a satellite backhaul) to fulfill higher-latency requests from a cloud/data center for websites, applications, database servers, etc. Additional or consolidated instances of the edge aggregation nodes 940 and the aggregation points 942, 944, including those deployed on a single server framework, may also be present within the edge cloud 980 or other areas of the TSP infrastructure.

Figure 10:
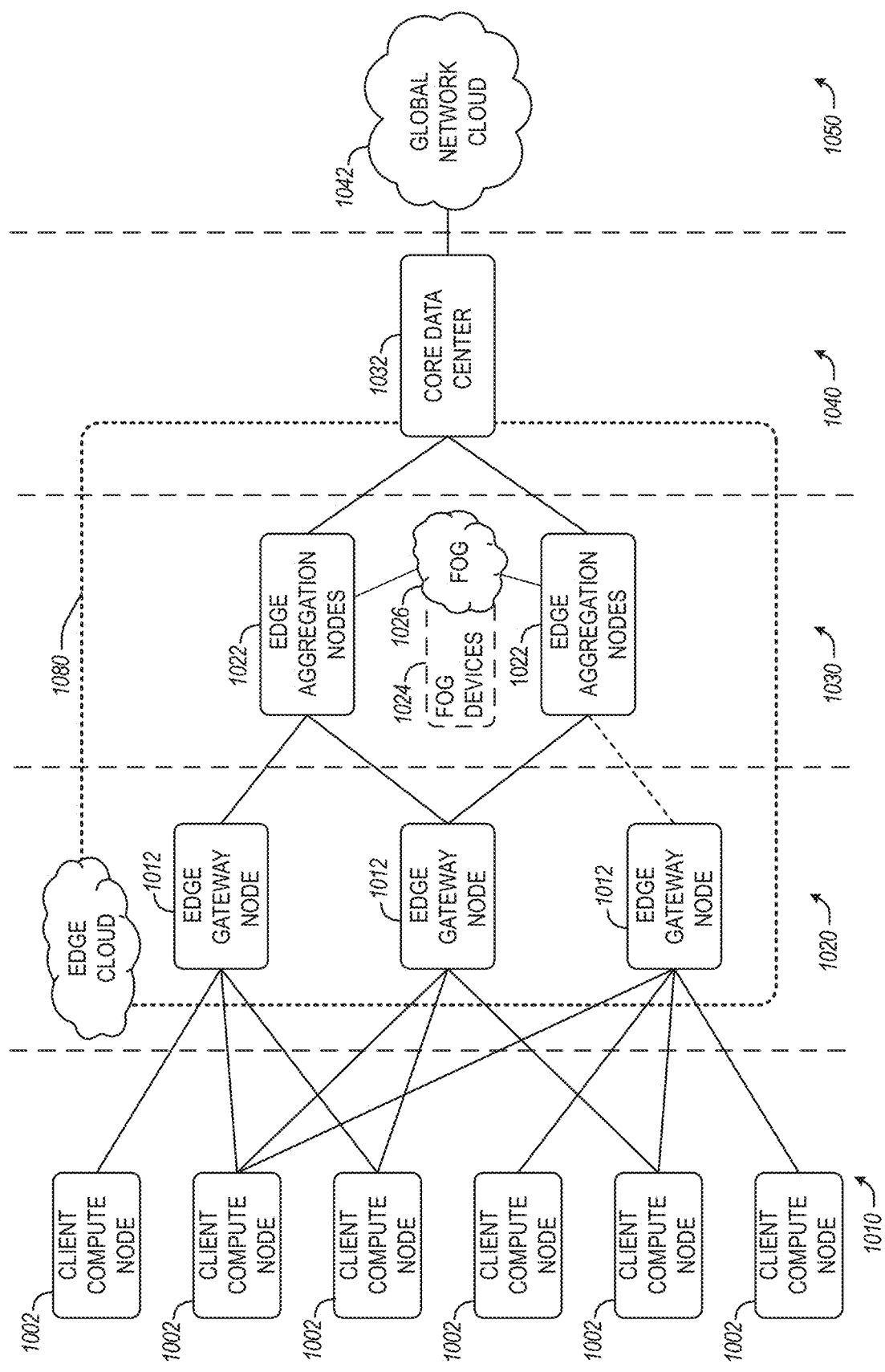
FIG. 10 illustrates an example approach for networking and services in an edge computing system, according to an example.

At a more generic level, an edge computing system may be described to encompass any number of deployments operating in the edge cloud 1580, which provide coordination from the client and distributed computing devices. FIG. 10 provides a further abstracted overview of layers of distributed compute deployed among an edge computing environment for purposes of illustration.

FIG. 10 generically depicts an edge computing system for providing edge services and applications to multi-stakeholder entities, as distributed among one or more client compute nodes 1002, one or more edge gateway nodes 1012, one or more edge aggregation nodes 1022, one or more core data centers 1032, and a global network cloud 1042, as distributed across layers 1010, 1020, 1030, 1040, and 1050 of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer (of layers 1010, 1020, 1030, 1040, and 1050) corresponding to layers 810, 820, 830, 840. For example, the client compute nodes 1002 are each located at an endpoint layer 810, while each of the edge gateway nodes 1012 are located at an edge devices layer 820 (local level) of the edge computing system. Additionally, each of the edge aggregation nodes 1022 (and/or fog devices 1024, if arranged or operated with or among a fog networking configuration 1026) are located at a network access layer 830 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein apply to fog networks, fogging, and fog configurations. Further, aspects of the edge computing systems discussed herein may be configured as a fog, or aspects of fog may be integrated into an edge computing architecture.

The core data center 1032 is located at a core network layer 830 (e.g., a regional or geographically-central level), while the global network cloud 1042 is located at a cloud data center layer 840 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 1032 may be located within, at, or near the edge cloud 1080.

Although an illustrative number of client compute nodes 1002, edge gateway nodes 1012, edge aggregation nodes 1022, core data centers 1032, global network clouds 1042 are shown in FIG. 10, it should be appreciated that the edge computing system may include more or fewer devices or systems at each layer. Additionally, as shown in FIG. 8, the number of components of each layer 810, 820, 830, 840, generally increases at each lower level (i.e., when moving closer to endpoints). As such, one edge gateway node 1012 may service multiple client compute nodes 1002, and one edge aggregation node 1022 may service multiple edge gateway nodes 1012.

Consistent with the examples provided herein, each client compute node 1002 may be embodied as any type of end point component, device, appliance, or "thing" capable of communicating as a producer or consumer of data. Further, the label "node" or "device" as used in the edge computing system 1000 does not necessarily mean that such node or device operates in a client or agent/minion/follower role; rather, any of the nodes or devices in the edge computing system 1000 refer to individual entities, nodes, or subsystems which include discrete or connected hardware or software configurations to facilitate or use the edge cloud 1080.

As such, the edge cloud 1080 is formed from network components and functional features operated by and within the edge gateway nodes 1012 and the edge aggregation nodes 1022 of layers 820, 830, respectively. The edge cloud 1080 may be embodied as any type of network that provides edge computing and/or storage resources that are proximately located to radio access network (RAN) capable endpoint devices (e.g., mobile computing devices, IoT devices, smart devices, etc.), which are shown in FIG. 8 as the client compute nodes 1002. In other words, the edge cloud 1080 may be envisioned as an "edge" that connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 1080 may form a portion of or otherwise provide an ingress point into or across a fog networking configuration 1026 (e.g., a network of fog devices 1024, not shown in detail), which may be embodied as a system-level horizontal and distributed architecture that distributes resources and services to perform a specific function. For instance, a coordinated and distributed network of fog devices 1024 may perform computing, storage, control, or networking aspects in the context of an IoT system arrangement. Other networked, aggregated, and distributed functions may exist in the edge cloud 1080 between the cloud data center layer 840 and the client endpoints (e.g., client compute nodes 1002). Some of these are discussed in the following sections in the context of network functions or service virtualization, including the use of virtual edges and virtual services which are orchestrated for multiple stakeholders.

The edge gateway nodes 1012 and the edge aggregation nodes 1022 cooperate to provide various edge services and security to the client compute nodes 1002. Furthermore, because each client compute node 1002 may be stationary or mobile, each edge gateway node 1012 may cooperate with other edge gateway devices to propagate presently provided edge services and security as the corresponding client compute node 1002 moves about a region. To do so, each of the edge gateway nodes 1012 and/or edge aggregation nodes 1022 may support multiple tenancies and multiple stakeholder configurations, in which services from (or hosted for) multiple service providers and multiple consumers may be supported and coordinated across a single or multiple compute devices.

In further examples, any of the compute nodes or devices discussed with reference to the present computing systems and environment may be fulfilled based on the components depicted in FIGS. 11A and 11B. Each compute node may be embodied as a type of device, appliance, computer, or other "thing" capable of communicating with other edge, networking, or endpoint components.

Figure 11A:
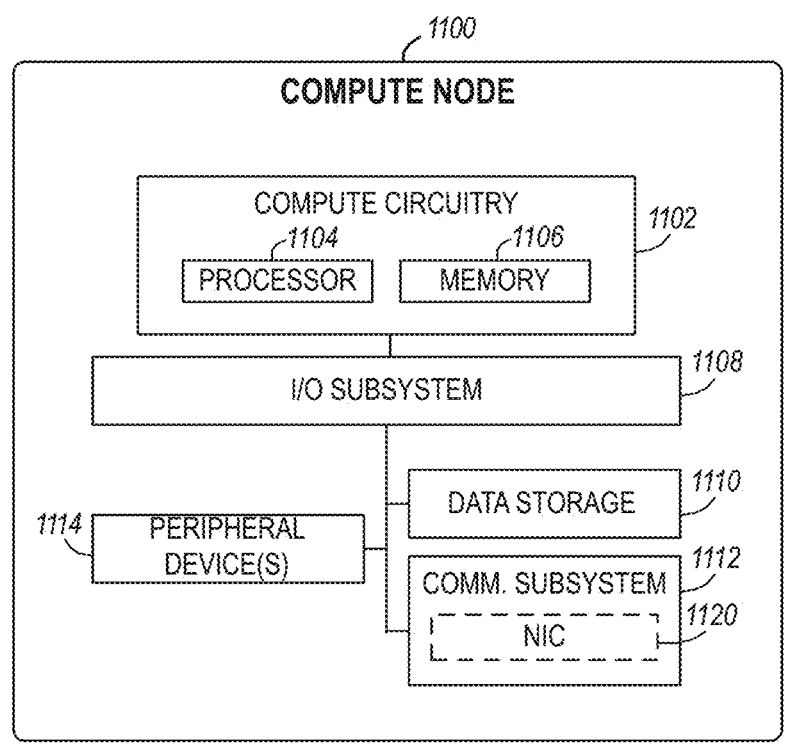
FIG. 11A illustrates an overview of example components deployed at a compute node system, according to an example.

In the simplified example depicted in FIG. 11A, an edge compute node 1100 includes a compute engine (also referred to herein as "compute circuitry") 1102, an input/output (I/O) subsystem 1108, data storage 1110, a communication circuitry subsystem 1112, and, optionally, one or more peripheral devices 1114. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1100 may be embodied as any type of engine, device, or collection of devices capable of performing various compute functions. In some examples, the compute node 1100 may be embodied as a single device such as an integrated circuit, an embedded system, a field-programmable gate array (FPGA), a system-on-a-chip (SOC), or other integrated system or device. In the illustrative example, the compute node 1100 includes or is embodied as a processor 1104 and a memory 1106. The processor 1104 may be embodied as any type of processor capable of performing the functions described herein (e.g., executing an application). For example, the processor 1104 may be embodied as a multi-core processor(s), a microcontroller, or other processor or processing/controlling circuit. In some examples, the processor 1104 may be embodied as, include, or be coupled to an FPGA, an application-specific integrated circuit (ASIC), reconfigurable hardware or hardware circuitry, or other specialized hardware to facilitate the performance of the functions described herein.

The main memory 1106 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte-addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 1106 may be integrated into the processor 1104. The main memory 1106 may store various software and data used during operation such as one or more applications, data operated on by the application(s), libraries, and drivers.

The compute circuitry 1102 is communicatively coupled to other components of the compute node 1100 via the I/O subsystem 1108, which may be embodied as circuitry and/or components to facilitate input/output operations with the compute circuitry 1102 (e.g., with the processor 1104 and/or the main memory 1106) and other components of the compute circuitry 1102. For example, the I/O subsystem 1108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1108 may form a portion of a system-on-a-chip (SoC) and be incorporated, along with one or more of the processor 1104, the main memory 1106, and other components of the compute circuitry 1102, into the compute circuitry 1102.

The one or more illustrative data storage devices 1110 may be embodied as any type of devices configured for short-term or long-term storage of data such as, for example, memory devices and circuits, memory cards, hard disk drives, solid-state drives, or other data storage devices. Each data storage device 1110 may include a system partition that stores data and firmware code for the data storage device 1110. Each data storage device 1110 may also include one or more operating system partitions that store data files and executables for operating systems depending on, for example, the type of compute node 1100.

The communication circuitry 1112 may be embodied as any communication circuit, device, or collection thereof, capable of enabling communications over a network between the compute circuitry 1102 and another compute device (e.g., an edge gateway node 1612 of the edge computing system 1610). The communication circuitry 1112 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to affect such communication.

The illustrative communication circuitry 1112 includes a network interface controller (NIC) 1120, which may also be referred to as a host fabric interface (HFI). The NIC 1120 may be embodied as one or more add-in-boards, daughter cards, network interface cards, controller chips, chipsets, or other devices that may be used by the compute node 1100 to connect with another compute device (e.g., an edge gateway node 1012). In some examples, the NIC 1120 may be embodied as part of a system-on-a-chip (SoC) that includes one or more processors or included on a multichip package that also contains one or more processors. In some examples, the NIC 1120 may include a local processor (not shown) and/or a local memory (not shown) that are both local to the NIC 1120. In such examples, the local processor of the NIC 1120 may be capable of performing one or more of the functions of the compute circuitry 1102 described herein. Additionally, the local memory of the NIC 1120 may be integrated into one or more components of the client compute node at the board level, socket level, chip level, and/or other levels.

Additionally, in some examples, each compute node 1100 may include one or more peripheral devices 1114. Such peripheral devices 1114 may include any type of peripheral device found in a compute device or server such as audio input devices, a display, other input/output devices, interface devices, and/or other peripheral devices, depending on the particular type of the compute node 1100. In further examples, the compute node 1100 may be embodied by a respective edge compute node in an edge computing system (e.g., client compute node 1002, edge gateway node 1012, edge aggregation node 1022) or like forms of appliances, computers, subsystems, circuitry, or other components.

In a more detailed example. FIG. 11B illustrates a block diagram of an example of components that may be present in an edge computing node 1150 for implementing the techniques (e.g., operations, processes, methods, and methodologies) described herein. The edge computing node 1150 may include any combinations of the components referenced above, and it may include any device usable with an edge communication network or a combination of such networks.

The components may be implemented as ICs, portions thereof, discrete electronic devices, or other modules, logic, hardware, software, firmware, or a combination thereof adapted in the edge computing node 1150, or as components otherwise incorporated within a chassis of a larger system. Further, to support the security examples provided herein, a hardware RoT (e.g., provided according to a DICE architecture) may be implemented in each IP block of the edge computing node 1150 such that any IP Block could boot into a mode where an RoT identity could be generated that may attest its identity and its current booted firmware to another IP Block or an external entity.

The edge computing node 1150 may include processing circuitry in the form of a processor 1152, which may be a microprocessor, a multi-core processor, a multithreaded processor, an ultra-low voltage processor, an embedded processor, or other known processing elements. The processor 1152 may be a part of a system on a chip (SoC) in which the processor 1152 and other components are formed into a single integrated circuit, or a single package, such as the Edison™ or Galileo™ SoC boards from Intel Corporation, Santa Clara, California. As an example, the processor 1152 may include an Intel® Architecture Core™ based processor, such as a Quark™, an Atom™, a Xeon™, an i3, an i5, an i7, an i9, or an MCU-class processor, or another such processor available from Intel®. However, any number of other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, a storage 1158 may also couple to the processor 1152 via the interconnect 1156. In an example, the storage 1158 may be implemented via a solid-state disk drive (SSDD). Other devices that may be used for the storage 1158 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low-power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such as resistance change memories, phase change memories, holographic memories, or chemical memories, among others.

The components may communicate over the interconnect 1156. The interconnect 1156 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC-based system. Other bus systems may be included, such as an I2C interface, an SPI interface, point-to-point interfaces, and a power bus, among others.

The interconnect 1156 may couple the processor 1152 to a transceiver 1066, for communications with the connected edge devices 1162. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1162. For example, a wireless local area network (WLAN) unit may be used to implement Wi-Fi® communications in accordance with the Institute of Electrical and Electronics Engineers (IEEE) 802.11 standard. Also, wireless wide area communications, e.g., according to a cellular or other wireless wide area protocol, may occur via a wireless wide area network (WWAN) unit.

The wireless network transceiver 1166 (or multiple transceivers) may communicate using multiple standards or radios for communications at a different range. For example, the edge computing node 1150 may communicate with close devices, e.g., within about 10 meters, using a local transceiver based on BLE, or another low power radio, to save power. More distant connected edge devices 1162, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1166 (e.g., a radio transceiver) may be included to communicate with devices or services in the edge cloud 1190 via local or wide area network protocols. The wireless network transceiver 1166 may be an LPWA transceiver that follows the IEEE 802.15.4, or IEEE 802.15.4g standards, among others. The edge computing node 1150 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1166, as described herein. For example, the transceiver 1166 may include a cellular transceiver that uses spread spectrum (SPA/SAS) communications for implementing high-speed communications. Further, any number of other protocols may be used, such as Wi-Fi® networks for medium-speed communications and provision of network communications. The transceiver 1166 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1168 may be included to provide a wired communication to nodes of the edge cloud 1190 or other devices, such as the connected edge devices 1162 (e.g., operating in a mesh). The wired communication may provide an Ethernet connection or may be based on other types of networks, such as Controller Area Network (CAN), Local Interconnect Network (LIN), DeviceNet, ControlNet, Data Highway+. PROFIBUS, or PROFINET, among many others. An additional NIC 1168 may be included to enable connecting to a second network, for example, a first NIC 1168 providing communications to the cloud over Ethernet, and a second NIC 1168 providing communications to other devices over another type of network.

Given the variety of types of applicable communications from the device to another component or network, applicable communications circuitry used by the device may include or be embodied by any one or more of components 1164, 1166, 1168, or 1170. Accordingly, in various examples, applicable means for communicating (e.g., receiving, transmitting, etc.) may be embodied by such communications circuitry.

The edge computing node 1150 may include or be coupled to acceleration circuitry 1164, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1156 may couple the processor 1152 to a sensor hub or external interface 1170 that is used to connect additional devices or subsystems. The devices may include sensors 1172, such as accelerometers, level sensors, flow sensors, optical light sensors, camera sensors, temperature sensors, global positioning system (GPS) sensors, pressure sensors, barometric pressure sensors, and the like. The hub or interface 1170 further may be used to connect the edge computing node 1150 to actuators 1174, such as power switches, valve actuators, an audible sound generator, a visual warning device, and the like.

In some optional examples, various input/output (I/O) devices may be present within or connected to, the edge computing node 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1150.

A battery 1176 may power the edge computing node 1150, although, in examples in which the edge computing node 1150 is mounted in a fixed location, it may have a power supply coupled to an electrical grid. The battery 1176 may be a lithium-ion battery, or a metal-air battery, such as a zinc-air battery, an aluminum-air battery, a lithium-air battery, and the like.

A battery monitor/charger 1178 may be included in the edge computing node 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1178 may communicate the information on the battery 1176 to the processor 1152 over the interconnect 1156. The battery monitor/charger 1178 may also include an analog-to-digital (ADC) converter that enables the processor 1152 to directly monitor the voltage of the battery 1176 or the current flow from the battery 1176. The battery parameters may be used to determine actions that the edge computing node 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the edge computing node 1150. A wireless battery charging circuit, such as an LTC4020 chip from Linear Technologies of Milpitas, California among others, may be included in the battery monitor/charger 1178. The specific charging circuits may be selected based on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application-specific integrated circuit (ASIC).

In an example, the instructions 1182 provided via the memory 1154, the storage 1158, or the processor 1152 may be embodied as a non-transitory, machine-readable medium 1160 including code to direct the processor 1152 to perform electronic operations in the edge computing node 1150. The processor 1152 may access the non-transitory, machine-readable medium 1160 over the interconnect 1156. For instance, the non-transitory, machine-readable medium 1160 may be embodied by devices described for the storage 1058 or may include specific storage units such as optical disks, flash drives, or any number of other hardware devices. The non-transitory, machine-readable medium 1160 may include instructions to direct the processor 1152 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 11B:
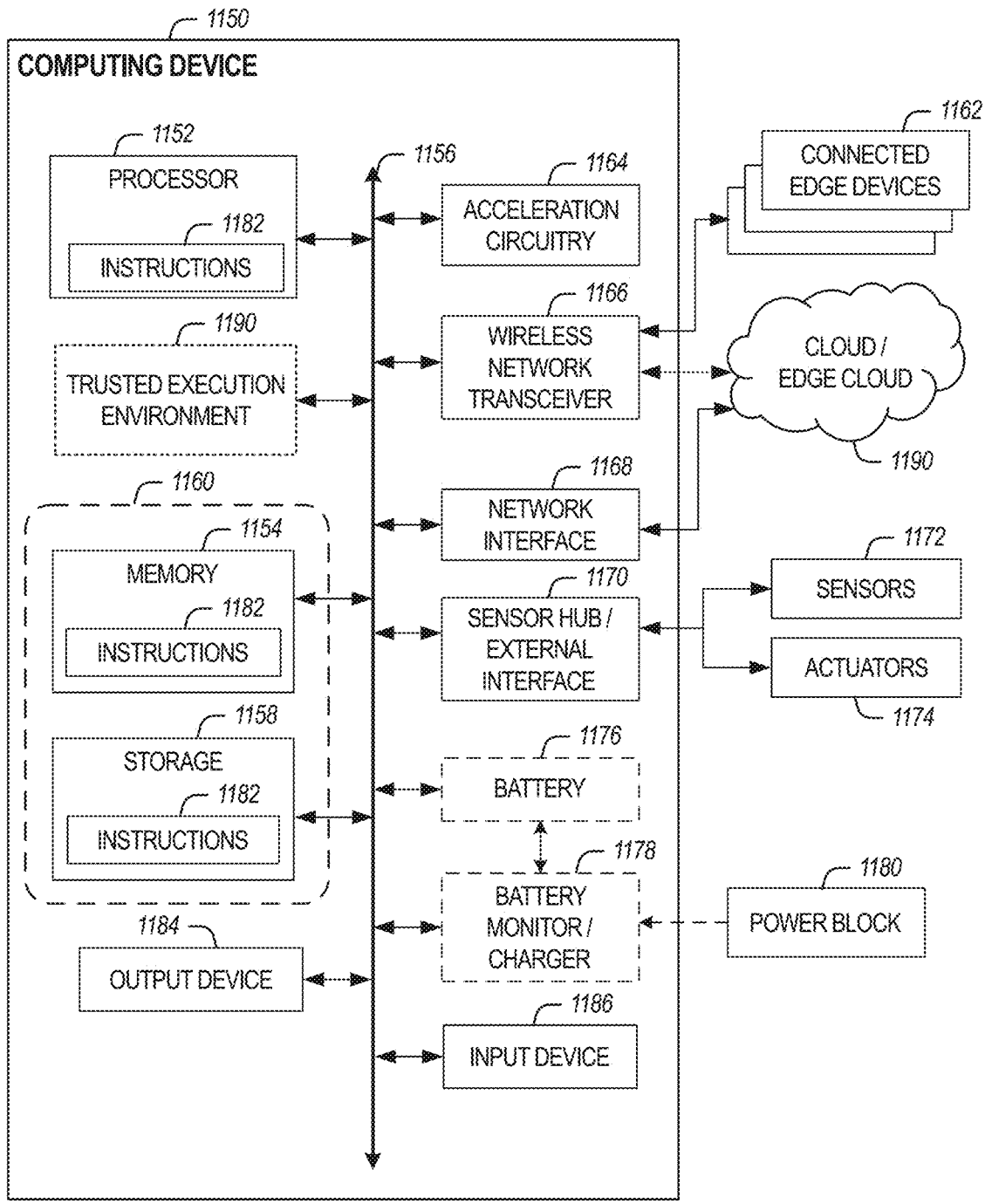
FIG. 11B illustrates a further overview of example components within a computing device, according to an example.

Each of the block diagrams of FIGS. 11A and 11B are intended to depict a high-level view of components of a device, subsystem, or arrangement of an edge computing node. However, it will be understood that some of the components shown may be omitted, additional components may be present, and a different arrangement of the components shown may occur in other implementations.

Figure 12:
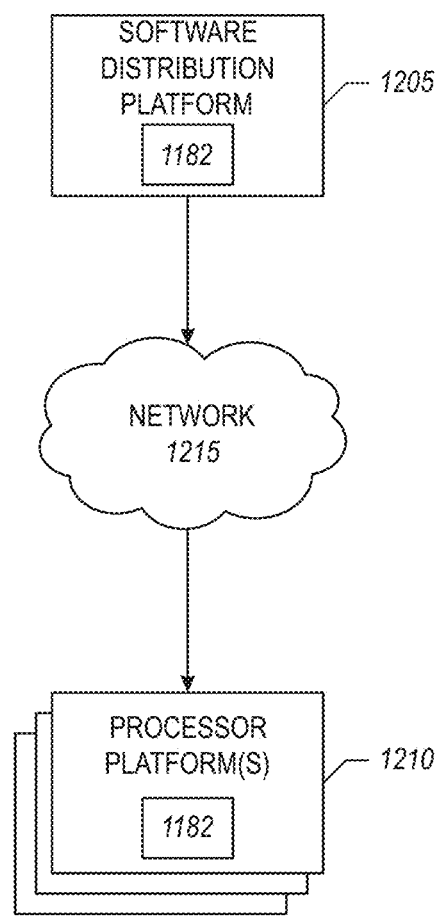
FIG. 12 illustrates a software distribution platform to distribute software instructions and derivatives, according to an example.

FIG. 12 illustrates an example software distribution platform 1205 to distribute software, such as the example computer-readable instructions 1182 of FIG. 11B, to one or more devices, such as processor platform(s) 1110 and/or other example connected edge devices or systems discussed herein. The example software distribution platform 1105 may be implemented by any computer server, data facility, cloud service, etc., capable of storing and transmitting software to other computing devices. Example connected edge devices may be customers, clients, managing devices (e.g., servers), third parties (e.g., customers of an entity owning and/or operating the software distribution platform 1105). Example connected edge devices may operate in commercial and/or home automation environments. In some examples, a third party is a developer, a seller, and/or a licensor of software such as the example computer-readable instructions 1182 of FIG. 11B. The third parties may be consumers, users, retailers, OEMs, etc. that purchase and/or license the software for use and/or re-sale and/or sub-licensing. In some examples, distributed software causes the display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 12, the software distribution platform 1205 includes one or more servers and one or more storage devices that store the computer-readable instructions 1182. The one or more servers of the example software distribution platform 1205 are in communication with a network 1215, which may correspond to any one or more of the Internet and/or any of the example networks described above. In some examples, one or more servers are responsive to requests to transmit the software to a requesting party as part of a commercial transaction. Payment for the delivery, sale, and/or license of the software may be handled by one or more servers of the software distribution platform and/or via a third-party payment entity. The servers enable purchasers and/or licensors to download the computer-readable instructions 1182 from the software distribution platform 1205. For example, the software, which may correspond to example computer-readable instructions, may be downloaded to the example processor platform(s), which is/are to execute the computer-readable instructions 1182. In some examples, one or more servers of the software distribution platform 1205 are communicatively connected to one or more security domains and/or security devices through which requests and transmissions of the example computer-readable instructions 1182 must pass. In some examples, one or more servers of the software distribution platform 1205 periodically offer, transmit, and/or force updates to the software (e.g., the example computer-readable instructions 1182 of FIG. 11B) to ensure improvements, patches, updates, etc. are distributed and applied to the software at the end-user devices.

In the illustrated example of FIG. 12, the computer-readable instructions 1182 are stored on storage devices of the software distribution platform 1205 in a particular format. A format of computer-readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer-readable instructions 1182 stored in the software distribution platform 1205 are in a first format when transmitted to the example processor platform(s) 1210. In some examples, the first format is an executable binary in which particular types of the processor platform(s) 1210 can execute. However, in some examples, the first format is uncompiled code that requires one or more preparation tasks to transform the first format to a second format to enable execution on the example processor platform(s) 1210. For instance, the receiving processor platform(s) 1200 may need to compile the computer-readable instructions 1182 in the first format to generate executable code in a second format that is capable of being executed on the processor platform(s) 1210. In still other examples, the first format is interpreted code that, upon reaching the processor platform(s) 1210, is interpreted by an interpreter to facilitate the execution of instructions.

Figure 13:
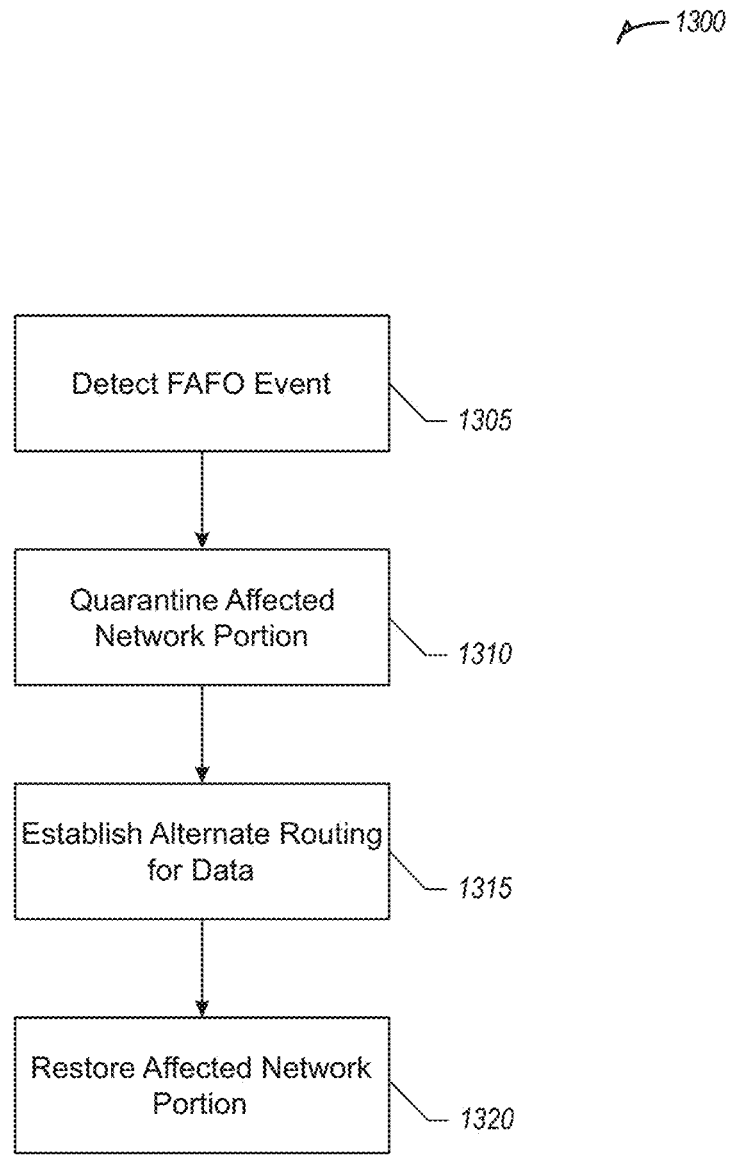
FIG. 13 illustrates a method of using the QCN, according to an example.

FIG. 13 illustrates a method of using the QCN, according to an example. FIG. 13 shows a simplified set of operations 1300 of the processes described above. At operation 1305, one or more FAFO events that affect the ITM are detected or predicted by the sentinels or AI model. In response to the detection, affected portions of the IMT are quarantined by the QxNFs at operation 1310. At operation 1315, the QxNFs then establish, for at least sensitive data, alternate paths that avoid the quarantined portion of the network to network slices that are isolated from the quarantined portion of the network. At operation 1320, the QCN then restores the IMT so that the IMT network is recovered.

EXAMPLES

Example 1 is a network apparatus comprising: processing circuitry; and a memory device including instructions embodied thereon, wherein the instructions, which when executed by the processing circuitry, configure the processing circuitry to: track a predetermined number of events related to an access of a predetermined network at a network element, the events including type of flow, payload, and telemetry of packets related to the access, the network element implemented as a physical network function (PNF) or virtual network function (VNF); use an artificial intelligence (AI) model, using information obtained by a sensor as input, to: determine that an attack has caused a Fault-Attack-Failure-Outage (FAFO) event at the network element; and determine a type of the attack, the FAFO event comprising failure or predicted failure of the network element; and switch, in response to a determination of the attack, from use of the network element to use of a counterpart a quarantine physical network function (QPNF) or quarantine virtual network function (QVNF).

In Example 2, the subject matter of Example 1 includes, wherein the instructions, when executed by the processing circuitry, configure the processing circuitry to: determine that resources of the predetermined network have reduced utilization due to the attack, and perform opportunistic training of the AI model in response to a determination that the resources of the predetermined network have reduced utilization.

In Example 3, the subject matter of Examples 1-2 includes, wherein the QPNF is deployed at an interface point where composite network services (CNSs) overlap, and the CNSs overlap at dedicated network slices.

In Example 4, the subject matter of Examples 1-3 includes, wherein the instructions, when executed by the processing circuitry, configure the processing circuitry to: provide a pre-allocated set of resources, from a plurality of providers, to provide specific services by the network element, the specific services comprising: user equipment (UE) services having a predetermined quality of service (QoS), and recovery services that use recovery resources specifically allocated to support recovery of the network element, and maintain the recovery resources until the predetermined network is stable.

In Example 5, the subject matter of Example 4 includes, wherein the specific services further comprise resources specifically allocated to support recovery of a software aspect or a physical aspect of the network element.

In Example 6, the subject matter of Example 5 includes, wherein the specifically allocated resources are predetermined for, and exclusive to, the network element.

In Example 7, the subject matter of Examples 5-6 includes, wherein the specifically allocated resources are maintained until the predetermined network is stable.

In Example 8, the subject matter of Examples 1-7 includes, of the network element.

In Example 9, the subject matter of Examples 1-8 includes, wherein the QPNF and QVNF are disposed in a dedicated control network that is separate from a PNF and VNF of the predetermined network.

In Example 10, the subject matter of Examples 1-9 includes, wherein the QPNF and QVNF are disposed in a software defined control network in which the QPNF is disposed in physical network equipment that provides a PNF and VNF of the predetermined network.

In Example 11, the subject matter of Examples 1-10 includes, wherein the instructions, when executed by the processing circuitry, configure the processing circuitry to provide a high priority, low data rate, low latency channel to service user equipment (UE) served by the predetermined network, are further configured to at least one of: at a physical (PHY) layer, select the channel or a transmission technique, or at middleware, at least one of: select different radio access technologies (RATs), or select different edge devices.

In Example 12, the subject matter of Examples 1-11 includes, wherein: the AI model is trained to classify inputs based on performance measurements of the network element, and the network element is a physical network element or a software element.

Example 13 is a Quarantine Control Network (QCN) comprising: processing circuitry; and a memory device including instructions embodied thereon, wherein the instructions, which when executed by the processing circuitry, configure the processing circuitry to implement the QCN in a Resiliency Control Network (RCN), the QCN comprising: a plurality of quarantine physical network functions (QPNFs) and quarantine virtual network functions (QVNFs) distributed throughout a predetermined network; a plurality of sensors distributed throughout the predetermined network to monitor the predetermined network; and a plurality of sentinels distributed throughout the predetermined network, the plurality of sentinels configured to: receive information about the network from the plurality of sensors; determine from the information that a Fault-Attack-Failure-Outage (FAFO) event has occurred, the FAFO event comprising failure or predicted failure of a portion of the predetermined network, and control, in response to a determination of the FAFO event and via privileged access, the QPNFs and QVNFs to quarantine the portion of the predetermined network.

In Example 14, the subject matter of Examples 1-13 includes, wherein the instructions, when executed by the processing circuitry, configure the processing circuitry to implement the QCN to: determine, using the information, a containment strategy that identifies a topology associated with a portion of the predetermined network for quarantine, the topology mapped to determined QPNFs and determined QVNFs, and instruct the determined QPNFs and determined QVNFs to close a perimeter of the portion of the predetermined network to prevent outbreak of the FAFO event to other portions of the predetermined network and protect resources in the other portions of the predetermined network from failure.

In Example 15, the subject matter of Examples 1-14 includes, wherein the instructions, when executed by the processing circuitry, configure the processing circuitry to implement the QCN to determine from the information that the FAFO event has occurred using an artificial intelligence (AI) model trained to classify inputs based on performance measurements of the predetermined network.

In Example 16, the subject matter of Example 15 includes, wherein the instructions, when executed by the processing circuitry, configure the processing circuitry to implement the QCN to provide a high priority, low data rate, low latency channel to service user equipments (UEs) served by the predetermined network, are further configured to at least one of: track a predetermined number of most recent events related to a particular UE, or service access to the predetermined network at different physical network elements and software elements of the predetermined network, the most recent events including type of flow, payload, and telemetry of packets related to the particular UE or service access.

In Example 17, the subject matter of Example 16 includes, wherein: the most recent events are stored in a centralized FAFO event tracker, and the instructions, when executed by the processing circuitry, configure the processing circuitry to implement the QCN such that the plurality of sentinels are further configured to: determine, based on AI model classification of the FAFO event, that an attack on the predetermined network has caused the FAFO event, in response to detection of the attack on the predetermined network, associate a type of the attack with the most recent events stored in the centralized FAFO event tracker, store, in a pooled event tracker for a predetermined duration, a combination of telemetry and type of attack for each physical network element affected by the attack, and after a subset of the most recent events, perform opportunistic training of the AI model using the combination of telemetry and type of attack for each physical network element affected by the attack stored in the pooled event tracker.

In Example 18, the subject matter of Example 17 includes, wherein the instructions, when executed by the processing circuitry, configure the processing circuitry to implement the QCN such that the plurality of sentinels are further configured to: determine that resources of the predetermined network have reduced utilization due to the attack, and perform the opportunistic training of the AI model in response to a determination that the resources of the predetermined network have reduced utilization.

Example 19 is a non-transitory device-readable storage medium comprising: information representative of instructions, wherein the instructions, when executed by processing circuitry of a device, cause the processing circuitry to: track a predetermined number of events related to an access of a predetermined network at a network element, the events including type of flow, payload, and telemetry of packets related to the access, the network element implemented as a physical network function (PNF) or virtual network function (VNF); use an artificial intelligence (AI) model, using information obtained by a sensor as input, to: determine that an attack has caused a Fault-Attack-Failure-Outage (FAFO) event at the network element; and determine a type of the attack, the FAFO event comprising failure or predicted failure of the network element; and switch, in response to a determination of the attack, from use of the network element to use of a counterpart a quarantine physical network function (QPNF) or quarantine virtual network function (QVNF).

In Example 20, the subject matter of Example 19 includes, wherein the instructions, when executed by processing circuitry, cause the processing circuitry to: determine that resources of the network have reduced utilization due to the attack; and perform opportunistic training of the AI model in response to a determination that the resources of the network have reduced utilization.

In Example 21, the subject matter of Examples 19-20 includes, wherein the instructions, when executed by processing circuitry, cause the processing circuitry to: determine, using the information, a containment strategy that identifies a topology associated with a portion of the network for quarantine, the topology mapped to determined QPNFs and determined QVNFs; and instruct the determined QPNFs and determined QVNFs to close a perimeter of the portion of the network to prevent outbreak of the FAFO events to other portions of the network and protect resources in the other portions of the network from failure.

In Example 22, the subject matter of Example 21 includes, wherein the instructions, when executed by processing circuitry, cause the processing circuitry to provide a pre-allocated set of resources from a plurality of providers to provide specific services, the specific services comprising: user equipment (UE) services having a predetermined quality of service (QoS), and recovery services that use recovery resources specifically allocated to support recovery of the portion of the network for quarantine.

In Example 23, the subject matter of Examples 19-22 includes, wherein the instructions, when executed by processing circuitry, cause the processing circuitry to: after the perimeter of the portion of the network is closed and recovery of the portion of the network for quarantine has been initiated, determine whether the network is stable; and maintain the recovery resources until a determination that the network is stable.

Example 24 is a method of providing network support, the method comprising: detecting a Fault-Attack-Failure-Outage (FAFO) event at at least one network portion in a network using an artificial intelligence (AI) model to determine the FAFO event based on information from the at least one network portion; and in response to detection of the FAFO event, at the at least one network portion to: switch from use of PNFs or QNFs to use of counterpart quarantine physical network functions (QPNFs) and quarantine virtual network functions (QVNFs) to quarantine the at least one network portion; establish alternate routing for data that would otherwise traverse the at least one network portion; and restore the at least one network portion to provide a recovered network.

In Example 25, the subject matter of Example 24 includes, tracking a predetermined number of most recent events related to a particular user equipment (UE) or service access to the network at different physical network elements and software elements of the network, the most recent events including type of flow, payload, and telemetry of packets related to the particular UE or service access; using the AI model to determine, based on the information, that an attack on the network has caused the FAFO event and a type of the attack, each FAFO event comprising failure or predicted failure of network slices of the network; performing opportunistic training of the AI model using telemetry of the most recent events and type of attack for each physical network element affected by the attack; and in response to determining the attack, controlling the QPNFs and QVNFs to quarantine the network slices of the network, the QPNFs deployed at interface points where composite network services (CNSs) overlap.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Although these implementations have been described concerning specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

What is claimed is:

1. A network apparatus comprising:
processing circuitry; and
a memory device including instructions embodied thereon, wherein the instructions, which when executed by the processing circuitry, configure the processing circuitry to:
track a predetermined number of events related to an access of a predetermined network at a network element, the events including type of flow, payload, and telemetry of packets related to the access, the network element implemented as a physical network function (PNF) or virtual network function (VNF);
use an artificial intelligence (AI) model, using information obtained by a sensor as input, to:
determine that an attack has caused a Fault-Attack-Failure-Outage (FAFO) event at the network element; and
determine a type of the attack, the FAFO event comprising failure or predicted failure of the network element; and
switch, in response to a determination of the attack, from use of the network element to use of a counterpart quarantine physical network function (QPNF) or a counterpart quarantine virtual network function (QVNF).

2. The apparatus of claim 1, wherein the instructions, when executed by the processing circuitry, configure the processing circuitry to:
determine that resources of the predetermined network have reduced utilization due to the attack, and
perform opportunistic training of the AI model in response to a determination that the resources of the predetermined network have reduced utilization.

3. The apparatus of claim 1, wherein the QPNF is deployed at an interface point where composite network services (CNSs) overlap, and the CNSs overlap at dedicated network slices.

4. The apparatus of claim 1, wherein the instructions, when executed by the processing circuitry, configure the processing circuitry to:
provide a pre-allocated set of resources, from a plurality of providers, to provide specific services by the network element, the specific services comprising:
user equipment (UE) services having a predetermined quality of service (QOS), and
recovery services that use recovery resources specifically allocated to support recovery of the network element, and
maintain the recovery resources until the predetermined network is stable.

5. The apparatus of claim 4, wherein the specific services further comprise resources specifically allocated to support recovery of a software aspect or a physical aspect of the network element.

6. The apparatus of claim 5, wherein the specifically allocated resources are predetermined for, and exclusive to, the network element.

7. The apparatus of claim 5, wherein the specifically allocated resources are maintained until the predetermined network is stable.

8. The apparatus of claim 1, wherein the instructions, when executed by the processing circuitry, configure the processing circuitry to control the QPNF and QVNF to provide a predetermined quality of service (QOS) for a high priority, low data rate, low latency channel to service user equipment (UE) served by the network element by at least one of rerouting data paths or adding at least one redundant path at a Network Layer (L3) of the network element.

9. The apparatus of claim 1, wherein:
the predetermined network includes the PNF and VNF, and
the QPNF and QVNF are disposed in a dedicated control network that is separate from the predetermined network.

10. The apparatus of claim 1, wherein:
the predetermined network includes physical network equipment that provides at least one of the PNF or VNF, and
at least one of the QPNF or QVNF are disposed in a software defined control network in which the QPNF is disposed in the physical network equipment.

11. The apparatus of claim 1, wherein the instructions, when executed by the processing circuitry, configure the processing circuitry to provide a high priority, low data rate, low latency channel to service user equipment (UE) served by the predetermined network, are further configured to at least one of:
at a physical (PHY) layer, select a channel from among a plurality of channels or a transmission technique from among a plurality of transmission techniques, or
at middleware, at least one of:
select different radio access technologies (RATs), or
select different edge devices.

12. The apparatus of claim 1, wherein:
the AI model is trained to classify inputs based on performance measurements of the network element, and
the network element is a physical network element or a software element.

13. A Quarantine Control Network (QCN) comprising:
processing circuitry; and
a memory device including instructions embodied thereon, wherein the instructions, which when executed by the processing circuitry, configure the processing circuitry to implement the QCN in a Resiliency Control Network (RCN), the QCN comprising:
a plurality of quarantine physical network functions (QPNFs) and quarantine virtual network functions (QVNFs) distributed throughout a predetermined network;
a plurality of sensors distributed throughout the predetermined network to monitor the predetermined network; and
a plurality of sentinels distributed throughout the predetermined network, the plurality of sentinels configured to:

receive information about the predetermined network from the plurality of sensors;

track a predetermined number of events related to a particular user equipment (UE), the events including type of flow, payload, and telemetry of packets related to the particular UE or service access;

determine from the information that a Fault-Attack-Failure-Outage (FAFO) event has occurred, the FAFO event comprising failure or predicted failure of a portion of the predetermined network, and control, in response to a determination of the FAFO event and via privileged access, the QPNFs and QVNFs to quarantine the portion of the predetermined network.

14. The QCN of claim 13, wherein the instructions, when executed by the processing circuitry, configure the processing circuitry to implement the QCN to:

determine, using the information, a containment strategy that identifies a topology associated with a portion of the predetermined network for quarantine, the topology mapped to determined QPNFs and determined QVNFs, and instruct the determined QPNFs and determined QVNFs to close a perimeter of the portion of the predetermined network to prevent outbreak of the FAFO event to other portions of the predetermined network and protect resources in the other portions of the predetermined network from failure.

15. The QCN of claim 13, wherein the instructions, when executed by the processing circuitry, configure the processing circuitry to implement the QCN to determine from the information that the FAFO event has occurred using an artificial intelligence (AI) model trained to classify inputs based on performance measurements of the predetermined network.

16. The QCN of claim 15, wherein the instructions, when executed by the processing circuitry, configure the processing circuitry to implement the QCN to provide a high priority, low data rate, low latency channel to service UEs served by the predetermined network, are further configured to at least one of:

track a predetermined number of most recent events related to a particular UE, or service access to the predetermined network at different physical network elements and software elements of the predetermined network, the most recent events including type of flow, payload, and telemetry of packets related to the particular UE or service access.

17. The QCN of claim 16, wherein:

the most recent events are stored in a centralized FAFO event tracker, and the instructions, when executed by the processing circuitry, configure the processing circuitry to implement the QCN such that the plurality of sentinels are further configured to:

determine, based on AI model classification of the FAFO event, that an attack on the predetermined network has caused the FAFO event, in response to detection of the attack on the predetermined network, associate a type of the attack with the most recent events stored in the centralized FAFO event tracker, store, in a pooled event tracker for a predetermined duration, a combination of telemetry and type of attack for each physical network element affected by the attack, and after a subset of the most recent events, perform opportunistic training of the AI model using the combination of telemetry and type of attack for each physical network element affected by the attack stored in the pooled event tracker.

18. The QCN of claim 17, wherein the instructions, when executed by the processing circuitry, configure the processing circuitry to implement the QCN such that the plurality of sentinels are further configured to:

determine that resources of the predetermined network have reduced utilization due to the attack, and perform the opportunistic training of the AI model in response to a determination that the resources of the predetermined network have reduced utilization.

19. A non-transitory device-readable storage medium comprising: information representative of instructions, wherein the instructions, when executed by processing circuitry of a device, cause the processing circuitry to:

track a predetermined number of events related to an access of a predetermined network at a network element, the events including type of flow, payload, and telemetry of packets related to the access, the network element implemented as a physical network function (PNF) or virtual network function (VNF);

use an artificial intelligence (AI) model, using information obtained by a sensor as input, to:

determine that an attack has caused a Fault-Attack-Failure-Outage (FAFO) event at the network element; and determine a type of the attack, the FAFO event comprising failure or predicted failure of the network element; and switch, in response to a determination of the attack, from use of the network element to use of a counterpart quarantine physical network function (QPNF) or a counterpart quarantine virtual network function (QVNF).

20. The non-transitory device-readable storage medium of claim 19, wherein the instructions, when executed by processing circuitry, cause the processing circuitry to:

determine that resources of the predetermined network have reduced utilization due to the attack; and perform opportunistic training of the AI model in response to a determination that the resources of the predetermined network have reduced utilization.

21. The non-transitory device-readable storage medium of claim 19, wherein the instructions, when executed by processing circuitry, cause the processing circuitry to:

determine, using the information, a containment strategy that identifies a topology associated with a portion of the predetermined network for quarantine, the topology mapped to determined QPNFs and determined QVNFs; and instruct the determined QPNFs and determined QVNFs to close a perimeter of the portion of the predetermined network to prevent outbreak of the FAFO events to other portions of the predetermined network and protect resources in the other portions of the predetermined network from failure.

22. The non-transitory device-readable storage medium of claim 21, wherein the instructions, when executed by processing circuitry, cause the processing circuitry to provide a pre-allocated set of resources from a plurality of providers to provide specific services, the specific services comprising:

user equipment (UE) services having a predetermined quality of service (QOS), and recovery services that use recovery resources specifically allocated to support recovery of the portion of the predetermined network for quarantine.

23. The non-transitory device-readable storage medium of claim 22, wherein the instructions, when executed by processing circuitry, cause the processing circuitry to:

after the perimeter of the portion of the predetermined network is closed and recovery of the portion of the predetermined network for quarantine has been initiated, determine whether the predetermined network is stable; and maintain the recovery resources until a determination that the predetermined network is stable.

24. A method of providing network support, the method comprising:

detecting a Fault-Attack-Failure-Outage (FAFO) event at at least one network portion in a network using an artificial intelligence (AI) model to determine the FAFO event based on information from the at least one network portion;

tracking a predetermined number of events related to a particular user equipment (UE) or service access to the network, the events including type of flow, payload, and telemetry of packets related to the particular UE or service access; and in response to detecting the FAFO event, causing at the at least one network portion to:

switch from use of PNFs or QNFs to use of counterpart quarantine physical network functions (QPNFs) and quarantine virtual network functions (QVNFs) to quarantine the at least one network portion;

establish alternate routing for data that would otherwise traverse the at least one network portion; and restore the at least one network portion to provide a recovered network.

25. The method of claim 24, further comprising:

tracking a predetermined number of most recent events related to the particular UE or service access to the network at different physical network elements and software elements of the network, the most recent events including the type of flow, payload, and telemetry of packets related to the particular UE or service access;

using the AI model to determine, based on the information, that an attack on the network has caused the FAFO event and a type of the attack, each FAFO event comprising failure or predicted failure of network slices of the network;

performing opportunistic training of the AI model using telemetry of the most recent events and type of attack for each physical network element affected by the attack; and in response to determining the attack, controlling at least one of the QPNFs or QVNFs to quarantine the network slices of the network, the QPNFs deployed at interface points where composite network services (CNSs) overlap.

* * * * *